(12) United States Patent
Godwin et al.

(10) Patent No.: US 8,115,034 B2
(45) Date of Patent: Feb. 14, 2012

(54) POLYKETONE PLASTICIZERS

(75) Inventors: Allen D. Godwin, Seabrook, TX (US);
Kenneth J. Buturla, Baton Rouge, LA (US); Karla S. Colle, Houston, TX (US); Gabor Kiss, Hampton, NJ (US); Kirk C. Nadler, Houston, TX (US); Abhimanyu O. Patil, Westfield, NJ (US); Edris Eileen Pike, Prairieville, LA (US); Ramzi Y. Saleh, Baton Rouge, LA (US); Jon E. Stanat, Baton Rouge, LA (US); Manika Varma-Nair, Warren, NJ (US); Stephen Zushma, Clinton, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 462 days.

(21) Appl. No.: 12/058,397

(22) Filed: Mar. 28, 2008

(65) Prior Publication Data

US 2008/0242895 A1   Oct. 2, 2008

Related U.S. Application Data

(60) Provisional application No. 60/920,983, filed on Mar. 30, 2007.

(51) Int. Cl.
C07C 45/00 (2006.01)
C07C 45/27 (2006.01)
C08G 67/00 (2006.01)
C08G 67/02 (2006.01)

(52) U.S. Cl. ......... 568/387; 568/414; 528/220; 528/392

(58) Field of Classification Search ............ 568/387, 568/414; 528/392, 220
See application file for complete search history.

(56) References Cited

U.S. PATENT DOCUMENTS

| | | | |
|---|---|---|---|
| 3,780,140 | A | 12/1973 | Hammer |
| 4,929,701 | A | 5/1990 | Van Broekhoven |
| 5,300,596 | A | 4/1994 | Hlatky |
| 6,156,872 | A | 12/2000 | Patil et al. |
| 6,262,225 | B1 | 7/2001 | Patil et al. |
| 6,541,586 | B2 | 4/2003 | Patil et al. |
| 6,642,328 | B2 | 11/2003 | Patil et al. |

(Continued)

FOREIGN PATENT DOCUMENTS

WO  WO 2004/020500  3/2004

OTHER PUBLICATIONS

Godwin, "Plasticizers," Applied Polymer Science, 21$^{st}$ Century, Eds. C. D. Craver and C. E. Carraher, Elsevier (2000), pp. 157-175.

(Continued)

*Primary Examiner* — Duc Truong
(74) *Attorney, Agent, or Firm* — Andrew B. Griffis; Leandro Arechederre, III

(57) ABSTRACT

The invention relates to polyketone compounds and the at least partially hydrogenated products thereof, the use of said polyketone compounds and/or the at least partially hydrogenated products thereof as plasticizers, processes of making polyketone compounds and the at least partially hydrogenated products thereof, compositions comprising the polyketone compounds and/or the at least partially hydrogenated products thereof, and to articles formed from products of the invention.

9 Claims, 7 Drawing Sheets

U.S. PATENT DOCUMENTS

| | | | |
|---|---|---|---|
| 6,740,718 | B2 | 5/2004 | Patil et al. |
| 6,750,278 | B2 | 6/2004 | Patil et al. |
| 6,777,514 | B2 | 8/2004 | Patil et al. |
| 6,864,319 | B2 | 3/2005 | Patil et al. |
| 6,881,806 | B2 | 4/2005 | Patil et al. |
| 2003/0181593 | A1 | 9/2003 | Patil et al. |

OTHER PUBLICATIONS

Morishima et al., "Synthesis, Structure and Some Properties of a New Polyalcohol," European Polymer Journal, vol. 9, Iss. 7, Jul. 1973, pp. 669-672.

Brubaker et al., "Synthesis and Characterization of Ethylene/Carbon Monoxide Copolymers, A New Class of Polyketones," J. Am. Chem. Soc., 1952, vol. 74, pp. 1509-1515.

POLYKETONE PLASTICIZERS

CROSS REFERENCE TO RELATED APPLICATION

This application claims priority to U.S. Provisional Patent Application No. 60/920,983 filed Mar. 30, 2007, the disclosures of which are incorporated herein by reference in its entirety.

FIELD OF THE INVENTION

The invention relates to polyketone compounds and to the at least partially hydrogenated products thereof, the use of the polyketone compounds and at least partially hydrogenated products thereof as plasticizers, processes of making these compounds and compositions comprising the polyketone compounds, and to articles formed from therefrom.

BACKGROUND OF THE INVENTION

Plasticizers are incorporated into a resin (usually a polymer or elastomer) to increase the flexibility, workability, or distensibility of the resin. The largest use of plasticizers is in the production of "plasticized" or flexible polyvinyl chloride (PVC) products. Typical uses of plasticized PVC include films, sheets, tubing, coated fabrics, wire and cable insulation and jacketing, flooring materials such as vinyl sheet flooring or vinyl floor tiles, adhesives, sealants, inks, and medical products such as blood bags and tubing, and the like.

Other polymer systems that use plasticizers include polyvinyl butyral, acrylic polymers, poly(vinyldiene chloride), nylon, polyolefins, and certain fluoroplastics. Plasticizers can also be used with rubber (although often these materials are referred to as "extenders" for rubber rather than plasticizers). A listing of the major plasticizers and their compatibilities with different polymer systems is provided in "Plasticizers," A. D. Godwin, in Applied Polymer Science 21st Century, edited by C. D. Craver and C. E. Carraher, Elsevier (2000); pp. 157-175.

Plasticizers can be characterized on the basis of their chemical structure. The most important chemical class of plasticizers is phthalic acid esters, which accounted for about 85% worldwide of PVC plasticizer usage in 2002. For various reasons, particularly a combination of environmental and regulatory pressures, there is a movement away from using phthalates as plasticizers.

Two other important chemical classes are adipic acid esters, and trimellitic acid esters. These are currently expensive to produce and are not available in sufficient quantity to replace phthalates plasticizers. Newer plasticizers, such as esters based on cyclohexanoates (mono-, di-, and tri-acid esters) and benzoic acid are now commercially available but have not yet been shown to be generally useful in replacing phthalates in polymer systems such as PVC.

The concept of using polyketone materials as plasticizers for PVC has been described, for instance, in U.S. Pat. No. 6,750,278. Polyketone materials prepared with multicomponent feeds have been described inter alia in U.S. Pat. Nos. 6,541,586; 6,740,718; and 6,642,328. See also U.S. Pat. Nos. 6,156,872; 6,262,225; 6,777,514; 6,864,319; and 6,881,806.

There are numerous problems encountered in making commercial products using the aforementioned plasticizers. The problem areas include plasticizer color, plasticizer odor, and with the physical properties of the final composition and articles made therefrom, such as viscosity, haze, heat stability, UV stability, volatility, permanence, exudation, low temperature flexibility, and plasticizer efficiency.

The present inventors have surprisingly discovered novel polyketone oligomers, such as ethylene-butene-carbon monoxide oligomers, that provide improvement over heretofore available polyketone compounds in several areas, including, their use as plasticizers.

SUMMARY OF THE INVENTION

The invention is directed to polyketone compounds, their use as plasticizers, processes of making polyketone compounds, compositions comprising the polyketone compounds, and to articles formed from such compositions.

The invention is also directed to at least partially hydrogenated polyketone compounds, their use as plasticizers, process of making said at least partially hydrogenated polyketone compounds, compositions comprising said at least partially hydrogenated polyketone compounds, and to articles formed from such compositions.

In embodiments, the polyketone oligomers according to the invention are liquid, random, non-linear oligomers prepared by free radical polymerization. In embodiments the free radical polymerization uses either dilute and/or impure feeds, such as multicomponent syngas feed (MCS) or syngas (CO/$H_2$) feed, and in other embodiments the feed is pure. In another embodiment the product is subsequently at least partially hydrogenated after the free radical polymerization step.

In embodiments, the polyketone products are liquid, non-linear, random copolymers with CO-content of about 15 to about 30 mole %. In other embodiments, the polyketone products are obtainable by hydrogenating at least a portion of the aforementioned non-linear highly branched random copolymers with CO-content of about 15 to about 30-mole %.

These and other objects, features, and advantages will become apparent as reference is made to the following detailed description, figures, preferred embodiments, examples, and appended claims.

BRIEF DESCRIPTION OF THE DRAWINGS

In the accompanying drawings, like reference numerals are used to denote like parts throughout the several views.

DETAILED DESCRIPTION OF THE INVENTION

Figure 1:
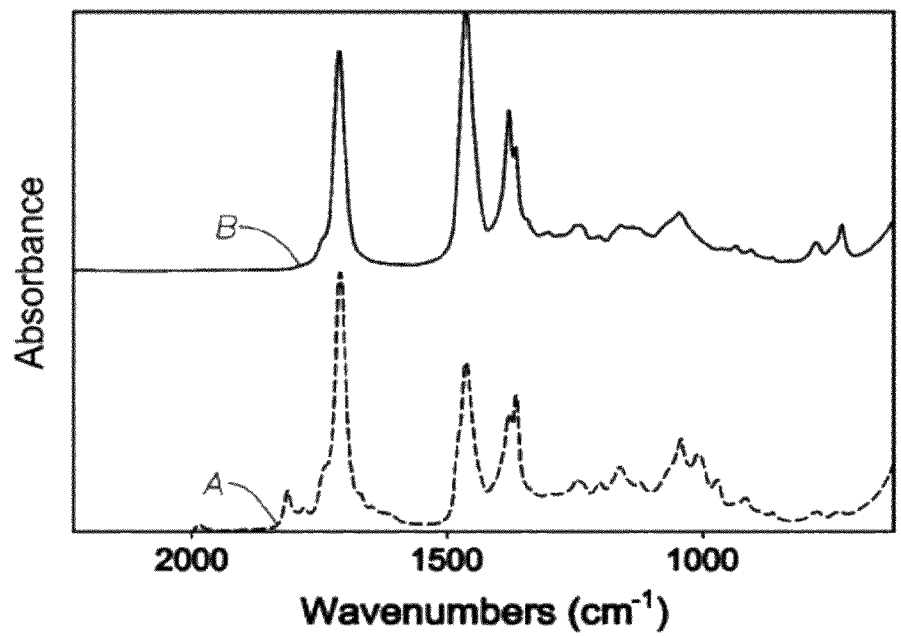
FIGS. 1 and 2 are IR spectra of polyketones according to embodiments the invention.

According to embodiments of the invention, there are provided polyketone compounds, which in preferred embodiments are useful in plasticizers. The invention is also concerned with methods of making polyketone compounds, compositions comprising the polyketone compounds, and articles formed from such compositions.

The polyketone compounds of the invention may be characterized as carbon monoxide-containing polymers further comprising at least one vinyl comonomer selected from free radical polymerizable vinyl monomers, such as ethylene, propylene, butene, and the like. It will be appreciated by one of skill in the art that this description should be read as being in the nature of a recipe as regards the various monomers. The preferred polyketones of the invention may be characterized as liquid, random, aliphatic polyketones.

The final product may, in embodiments and depending on the exact monomers and their concentration, be schematically by structure (I), below, which is an idealized representation of an ethylene/CO/butene oligomer according to the invention:

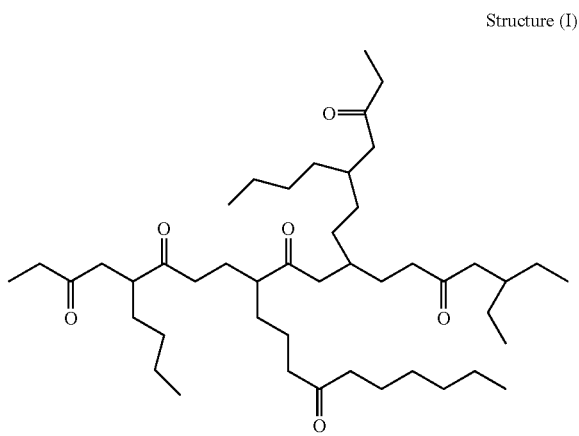

Structure (I)

The present inventors have surprisingly discovered that certain characteristics of the polyketone compounds according to the invention provides for a more efficient plasticizer, particularly for PVC. Thus, in embodiments, the polyketone compounds of the invention maybe described by one or more of the following:

(a) the preferred polyketones are copolymers of ethylene, butene, and carbon monoxide. More preferably, in embodiments and particularly for use as plasticizer for PVC, the polyketone compounds preferably are comprised of 53-80% ethylene, 15-25% or more preferably 16-25% or still more preferably 17-25% carbon monoxide, and 5-20% or more preferably 10-20% butene monomer units (thus the percentages are mol %);

(b) it is preferred that the number-averaged molecular weight of the polyketones according to the present invention be from about 600 to about 1000 g/mol, preferably 750-850 g/mol. With higher molecular weight, the product has higher glass-transition temperature (Tg), poorer lower temperature flexibility, poorer processability and tends to solidify upon standing at sub-ambient temperatures; at lower molecular weight, the product fumes during processing, suffers excessive plasticizer loss in high temperature applications, and exudes from PVC products;

(c) the presence of olefinic hydrogen is preferably less than 1 mol %, still more preferably <0.1 mol %, as measured by proton nuclear magnetic resonance ($^1$H NMR). Reduced olefinic carbon, such as by hydrogenation, eliminates color;

(d) light ends content is preferably less than 1 wt. %, as measured at 160° C. by thermogravimetric analysis (TGA). The present inventors have discovered that this controls fuming, weight loss in high temperature applications, and during exudation. Weight loss (representing "light ends" content) is defined as the cumulative weight loss in TGA at 10° C./min heating rate under flowing $N_2$;

(e) in preferred embodiments, the viscosity of polyketones according to the invention, at 25° C., should be less than 1500 cP, more preferably less than 1100 cP;

(f) in preferred embodiments, the polyketones of the invention will have a density ranging from about 0.91 to about 0.96 g/ml at 25° C.

In more preferred embodiments the polyketone compound useful as a plasticizer, particularly with PVC, will be characterized by at least two of the above characteristics, still more preferably three, and yet still more preferably four of the above characteristics, yet even more preferably five of the above characteristics, and most preferably by all six of the characteristics, i.e., (a) through (f) listed above.

Other preferred embodiments, which may also include characteristics described in the paragraph above (e.g., as defined in at least one of characteristics (a)-(f), preferably two, more preferably three, still more preferably four, yet still more preferably five, and most preferably all six of said characteristics), there is a polyketone plasticizer and having a carbonyl (CO) carbon content of 15 to 20 mol %, or in embodiments 16-19 mol %, of the total carbon as measured by $^{13}$C NMR and/or with an alcohol (C—OH) hydrogen content of less than 0.5 mol % of the total hydrogen present as measured by $^1$H NMR.

According to another embodiment of the invention, there are provided at least partially hydrogenated polyketone compounds such as described above, so that at least some of the carbonyl groups are converted to hydroxyl or alcohol (OH) groups, as represented schematically by structure (II) below, which results from partial reduction of structure (I) according to the invention:

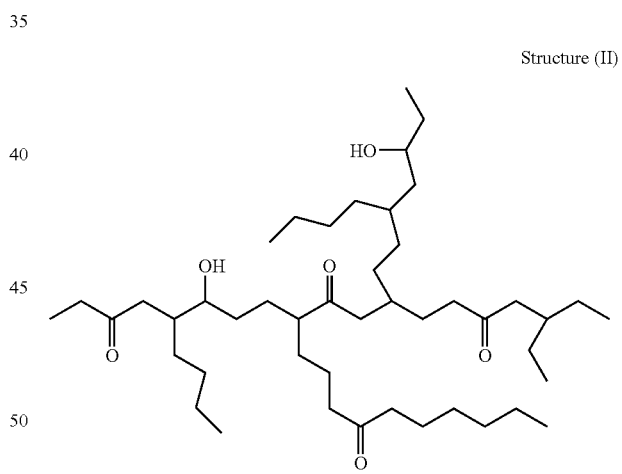

Structure (II)

Thus, in an embodiment, there is a polyketone-polyol plasticizer with properties as defined in one or more of characteristics (a)-(f), above, which may still further be characterized by having a carbonyl (CO) carbon content of 15-20 mol % or in embodiments 16-20 mol % or in other embodiments of 16-19 mol %, or in still other embodiments of 17-20 mol %, of the total carbon as measured by $^{13}$C NMR and/or with an hydroxyl (OH) hydrogen content of 2.5 mol % or less, preferably 0.5 mol % or less, or in embodiments 0.5-2.5 mol %, of the total hydrogen present as measured by $^1$H NMR.

Yet another preferred characteristic of the polyketone or polyketone-polyol compounds according to the invention is a plasticizer color of <50 Pt/Co (ASTM D1209 test Standard Test Method for color of Clear Liquids, Platinum-Cobalt Scale), further characterized by at least one, preferably two, more preferably three, and still more preferably four, and yet still more preferably five, and most preferably all six of the characteristics (a)-(f) above.

The process of the invention comprises free radical copolymerization of one or more vinyl monomers and carbon monoxide. One of the advantages of the present invention over production of phthalate plasticizers is that the process may occur in a single step.

Typically copolymerization is carried out at temperatures ranging from about 50 to about 230° C., preferably from about 50° C. to about 190° C. or in embodiments from about 100° C. to about 200° C., more preferably about 165° C. to about 185° C., and pressures can range from about 100 psig to about 30,000 psig and preferably from about 500 psig to about 5000 psig. The polymerization process can be batch, semi-batch or continuous.

While free radical polymerization may be initiated with or without a dedicated reagent (initiator) and/or thermally or with irradiation, it is preferred that an initiator be used. Conventional initiators such as tert-butyl peroxypivalate (TBPP or Trigonox 25), tert-butyl peroxy-2-ethylhexanoate (Trigonox 21), and di-tert-butyl peroxide (TBP or Trigonox B) may be used. $^{13}$C NMR analysis of the polyketones made according to the process of the invention and initiated by these conventional initiators indicates that little, if any, of the initiator is incorporated in the products. Other representative initiators include dialkyl peroxides such as, 2,5-dimethyl-2, 5-ditertiary-butyl-peroxyhexane, di-cumyl peroxide; alkyl peroxides such as tertiary-butyl hydroperoxide, tertiary-octyl hydroperoxide, cumene hydroperoxide; aryl peroxides such as benzoyl peroxide; peroxy esters such as tertiary-butyl peroxypivalate, tertiary-butyl-perbenzoate; and compounds such as azo-bis-isobutyronitrile. Free radical initiators with an appropriate half-life at a reaction temperature ranging from about 50° C. to about 200° C. can be used, and of these, t-butyl peroxide (TBP) is preferred.

Preferably, the reaction occurs in the presence of a solvent. Suitable solvents include toluene, benzene, dioxane, pentane, heptane, hexane, propylene oxide, cyclohexane, MEK, acetone, mixtures thereof, and the like. Hexane and/or MEK are preferred. The polyketone products of the invention may be recovered by solvent evaporation.

Besides the conventional syngas components of CO and $H_2$, typical multi-component synthesis gas (MCS) mixtures also contain unsaturated hydrocarbons, such as ethylene, acetylene, propylene, propyne, butenes, butadiene, etc. Non-pure feedstreams are further described in U.S. Pat. Nos. 6,049,011, and 6,541,586. Pure feeds are defined as being at or close to 100% pure. One of skill in the art would recognize the difference between a "pure feedstream" and a "non-pure feedstream" such as synthesis gas (syn gas) and MCS. Other hydrocarbon feedstreams are discussed hereinbelow.

It has been surprisingly found that in addition to changing the composition of the feed and reaction conditions, solvent selection is important in determining the physical properties of the polymer product. The use of polar solvents produces polyketones with low number-average molecular weight (Mn), high branching (branching index or BI), low glass-transition temperatures (Tg), low viscosity (VIS), and high volatility (VOL), whereas non-polar solvents make polymers with higher Mn, lower BI, higher Tg, higher VIS, and lower VOL. In order to obtain a polyketone of the invention that is superior in properties as a plasticizer for PVC, it is advantageous to use a non-polar solvent because the resulting polymer is less volatile and requires less light ends removal to meet volatility requirement and still obtaining a liquid polymer with acceptable viscosity and plasticizer performance. This is to be taken as guidance by one of ordinary skill in the art and determination of the specific solvent to be used (as well as other reaction conditions) is within the skill of the ordinary artisan in possession of the present disclosure without more than routine experimentation. For instance, one can attenuate volatility and Mn of the polymer by selecting mixed polar/non-polar solvent In preferred embodiments, Refinery Raffinate-1 or -2 streams (or combinations thereof) may be used in the process where the butane functions as the non-polar solvent and the butenes as the co-monomers. Raffinate-1 or -2 (Raff-1 or Raff-2, respectively) are per se well-known. See, for instance, WO2007106215.

Another advantage of the present invention is offered by hydrogenating one or more of the above-described polyketones. This is particularly advantageous when the product of the free radical polymerization is colored and a colorless plasticizer is desired. In a preferred embodiment, the present inventors have discovered that on mildly hydrogenating liquid polyketones, such as ethylene-butene-carbon monoxide oligomers, the product becomes colorless. Spectroscopic results (IR, UV, NMR) show that the color change is accomplished with a decrease or complete disappearance of olefinic unsaturation in the polyketones. The colorless polyketone or polyketone-polyol oligomer solution stays colorless in air for extended periods of time even at slightly elevated temperatures such as 60° C. Thus, hydrogenation is very effective in eliminating the color of the product oligomers. Moreover, occasionally small percent of CO groups in the copolymer get reduced to CH—OH group in this process. These liquid polyketone/polyalcohol copolymers are also effective PVC plasticizers.

In the process of the present invention comprising hydrogenation of the polyketone compounds, any heterogeneous or homogeneous catalyst can be applied that selectively saturates the olefinic bonds in the presence of carbonyl groups. Such catalysts are per se known in the art. For ease of separation, heterogeneous catalysts are preferred, and supported Pd catalysts are most preferred. Supports can include inorganic oxides, such as alumina, silica, titania, zirconia, and other suitable high surface area materials, such as charcoal, barium sulfate and the like, capable of supporting and stabilizing dispersed Pd metal.

The following examples are meant to illustrate embodiments of the present invention, and it will be recognized by one of ordinary skill in the art in possession of the present disclosure that numerous modifications and variations are possible. Therefore, it is to be understood that within the scope of the appended claims, the invention may be practiced otherwise than as specifically described herein.

EXAMPLE 1

Synthesis of Polyketone Oligomers According to the Present Invention Using Raff-II Feed and CO A 300-mL Autoclave Engineer's reactor was charged with 150-ml pure n-hexane and 0.64 g of a 75% solution of t-butyl peroxypivalate in mineral spirits. The reactor was sealed and purged with purified nitrogen. The reactor was then pressurized with 10.5 g of Raff-II feed (Raff-II Feed: 1-Butene: 60.49%, cis-2-butene: 17%, trans-2-butene 17%, isobutylene: 5.51% and butadiene: 5237 ppm). Temperature was raised to 66° C. while stirring, and the pressure was maintained for 24 hours. The reactor was allowed to cool to room temperature and then depressurized. The hexane solvent was removed on a rotary evaporator leaving 1.33 g of orange brown liquid product. The IR spectrum of the product is shown in FIG. 1 (bottom spectrum labeled A). The IR spectrum of the polymer showed a very strong peak at 1709 cm$^{-1}$ due to carbonyl group. The IR also showed small peaks at 1813 and at 1649 cm$^{-1}$. The peak at 1649 cm$^{-1}$ may be due to residual olefinic double bonds. Quantitative analysis of the $^{13}$C NMR spectrum of the product shows that the polymer has 18.9 mole % CO incorporation.

EXAMPLE 2

Hydrogenation of Polyketone Oligomers

The reactor was loaded with 2.0 g of orange brown polyketone oligomer product prepared by a procedure similar to discussed in the Example 1 along with 80 ml of heptane and 2.5 g of 5% palladium on barium sulfate. The reactor was pressurized and vented three times with 500-kPa nitrogen and three times with 3000 kPa hydrogen. The reactor was then pressurized with 3500 kPa hydrogen and heated with 120° C. for 1 hour. The solution was filtered and evaporated on a rotary evaporator to obtain colorless polyketone liquid product. The IR spectrum of the product is shown in FIG. 1 (top spectrum labeled B). The IR spectrum of the polymer showed a very strong peak at 1709 cm$^{-1}$ due to carbonyl group. The IR also showed small peaks at 1813 and at 1649 cm$^{-1}$ disappeared after mild hydrogenation.

EXAMPLES 3-7

Synthesis of Polyketone Polymers Using Ethylene, Carbon Monoxide and Butene Feed The oligomeric products were prepared in a 1000-ml Autoclave Engineer's batch autoclave. The reactor was purged with nitrogen before each experiment to exclude air. The reactor was charged with acetone solvent and the monomers then were heated to the reaction temperature. The reaction was initiated by injecting a solution of a peroxide radical initiator, such as tert-butyl peroxide (TBP). The reactor pressure was maintained by continuously feeding a blend of CO and ethylene through a pressure regulator valve into the reactor. The feed was a blend of ethylene and CO in a ratio of ethylene:CO of 1:1. The reaction temperature was maintained at 175° C. After the gas consumption could be no longer detected indicating the end of the reaction, the reactor head gas was vented and the liquid containing the product was drained into a collection vessel. In order to recover the product, the solvent was removed at 60° C. and 120 mbar pressure using standard laboratory equipment. The details about the reaction conditions and product analysis are shown in Table 1 and Table 2.

TABLE 1

Reaction conditions for preparation of O/CO products

| Example # | Feed C2= Mole % | Feed CO Mole % | Feed C4= Type | Feed Wt. g | Initiator Type | Initiator Wt. g | React Cond Press Psig | React Cond Temp ° C. | Yield g |
|---|---|---|---|---|---|---|---|---|---|
| 3 (MB23619-088) | 50.0 | 50.0 | i-C4= | 50.42 | TBP | 2.400 | 3000 | 175 | 8.1 |
| 4 (MB23619-066) | 50.0 | 50.0 | 1-C4= | 50.89 | TBP | 2.430 | 3000 | 175 | 9.7 |
| 5 (MB23619-086) | 50.0 | 50.0 | 1-C4= | 49.80 | TBP | 2.400 | 3000 | 175 | 10.3 |
| 6 (MB23619-084) | 50.0 | 50.0 | i-C4= | 48.33 | TBP | 2.400 | 3000 | 175 | 8.1 |
| 7 (MB23619-091) | 50.0 | 50.0 | i-C4= | 51.45 | TBP | 2.400 | 3000 | 175 | 9.3 |

TABLE 2

Characterization of O/CO products

| Example # | GPC $M_n$ Mole % | GPC $M_w$ Mole % | NMR E Wt % | NMR CO Wt % | NMR C4 Wt % | NMR Branches/ 1000 C. |
|---|---|---|---|---|---|---|
| 3 (MB23619-088) | 629 | 949 | 61.6 | 20.9 | 17.6 | 80.4 |
| 4 (MB23619-066) | 505 | 727 | 63.7 | 23.3 | 13.0 | 161 |
| 5 (MB23619-086) | 521 | 738 | 63.2 | 23.8 | 13.0 | 172 |
| 6 (MB23619-084) | 600 | 905 | 60.7 | 21.8 | 17.5 | 79.9 |
| 7 (MB23619-091) | 548 | 777 | 64.5 | 17.2 | 18.3 | 86 |

EXAMPLES 8-10

Mild Hydrogenation of Polyketone Polymers

The products of Examples 4 and 5 (Sample 23355-195B) as well as Examples of 6 and 7 (Sample 23355-195C) were combined and were mildly hydrogenated along with product of Example 3 (sample 23355-195A) using palladium on carbon. The hydrogenation was conducted in a batch autoclave at 100° C. and 600 psi of hydrogen pressure for 2 hours. 5 wt % (on feed) 10 wt % Pd on activated carbon catalyst (Aldrich, catalog #20,569-9). The recovered material balance for hydrogenation reaction was very high (>90%). The details about hydrogenation results are shown in Table 3.

TABLE 3

$^1$H NMR results for hydrogenated and original O/CO polymers

| Products | ID# | Treatment | % Aliphatic | % Olefinic | % CH$_n$OH |
|---|---|---|---|---|---|
| 23355-195A | 1240837 | Original | 98.31 | 1.68 | 0.00 |
| 23355-195A H | 1246394 | Hydro-finished | 99.63 | 0.00 | 0.37 |
| 23355-195B | 1240838 | Original | 98.51 | 1.48 | trace |
| 23355-195B H | 1254580 | Hydro-finished | 99.29 | 0.01 | 0.64 |
| 23355-195C | 1240839 | Original | 99.18 | 0.82 | 0.00 |

TABLE 3-continued $^1$H NMR results for hydrogenated and original O/CO polymers

| Products | ID# | Treatment | % Aliphatic | % Olefinic | % CH$_n$OH |
|---|---|---|---|---|---|
| 23355-195C H | 1255268 | Hydro-finished | 99.48 | 0.02 | 0.48 |

EXAMPLES 11-13

Effect of Activated Charcoal Treatment of Polyketone Polymers

The products 23355-195A and 23355-195C were treated with activated charcoal and the results are shown in Table 4. The data clearly show that activated charcoal is not very effective in reducing the olefinic double bonds. Visual inspection reveals that the product is very dark colored, which shows that activated charcoal did not decolorize the product.

TABLE 4

Effect of activated charcoal treatment on O/CO polymers

| Products | ID# | Treatment | % Aliphatic | % Olefinic |
|---|---|---|---|---|
| 23355-195A | 1240837 | Original | 98.31 | 1.68 |
| 23355-195A H | 1262051 | Activated charcoal | 98.91 | 1.09 |
| 23355-195C | 1240839 | Original | 99.18 | 0.82 |
| 23355-195C H | 1262062 | Activated charcoal | 98.83 | 1.15 |

EXAMPLE 14

Effect of Temperature on the Hydrogenated OCO Product in Air 0.479 g of colorless liquid of the hydrogenated polyketone product was kept in vial (uncapped) at 60° C. and color change was observed periodically. The colorless product remained colorless even after 19 days. This suggests that OCO product is stable in air at 60° C. for several days, even weeks.

EXAMPLE 15

Reduction of OCO Oligomers to Polyketones/Polyalcohols with Sodium Borohydride

Figure 2:
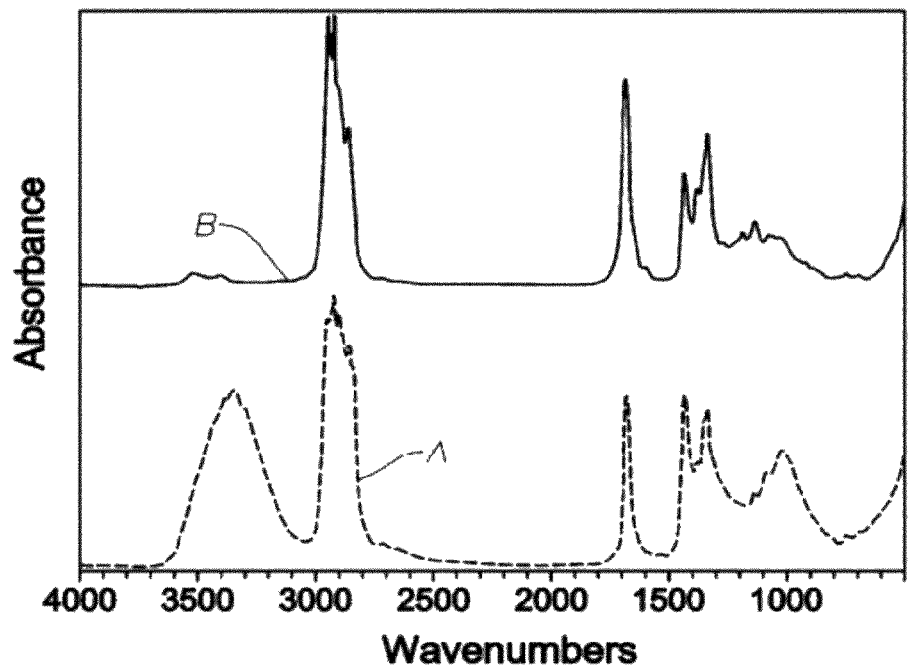

An ethylene isobutylene carbon monoxide terpolymer prepared using a procedure similar to the Example 3, containing 23.7 weight % carbon monoxide (2.2 g) was stirred in aqueous sodium borohydride solution (1.2-g sodium hydride dissolved in 20-ml water). The effervescent mixture was stirred at room temperature for 48 hours. The reaction mixture was made slightly acidic with aqueous HCl. After stirring for an additional 5 minutes, the water was decanted and the organic liquid was stirred with water twice and water was decanted. Finally the organic layer was stirred with acetone, acetone decanted the product was dried under vacuum at 100° C. for 24 hours. Yield 2.0 g. The $^{13}$C NMR of the product suggest that, after hydrogenation, the CO content (comprising both C=O and C—OH species) was 21.8 weight %. The carbonyl contribution was 14.7 weight %, and the alcohol contribution was 7.1 weight %, with ethylene and butene making up the remaining 78.2 weight %. The FTIR spectrum of the product (FIG. 2, bottom spectrum labeled A, before hydrogenation; FIG. 2, top spectrum, labeled B, after hydrogenation) also showed both alcohol and carbonyl functionality. The carbonyl absorption peak has decrease relative to original carbonyl absorption and it also shifted from 1711 cm$^{-1}$ to 1705 cm$^{-1}$ on partial hydrogenation.

Figure 6:
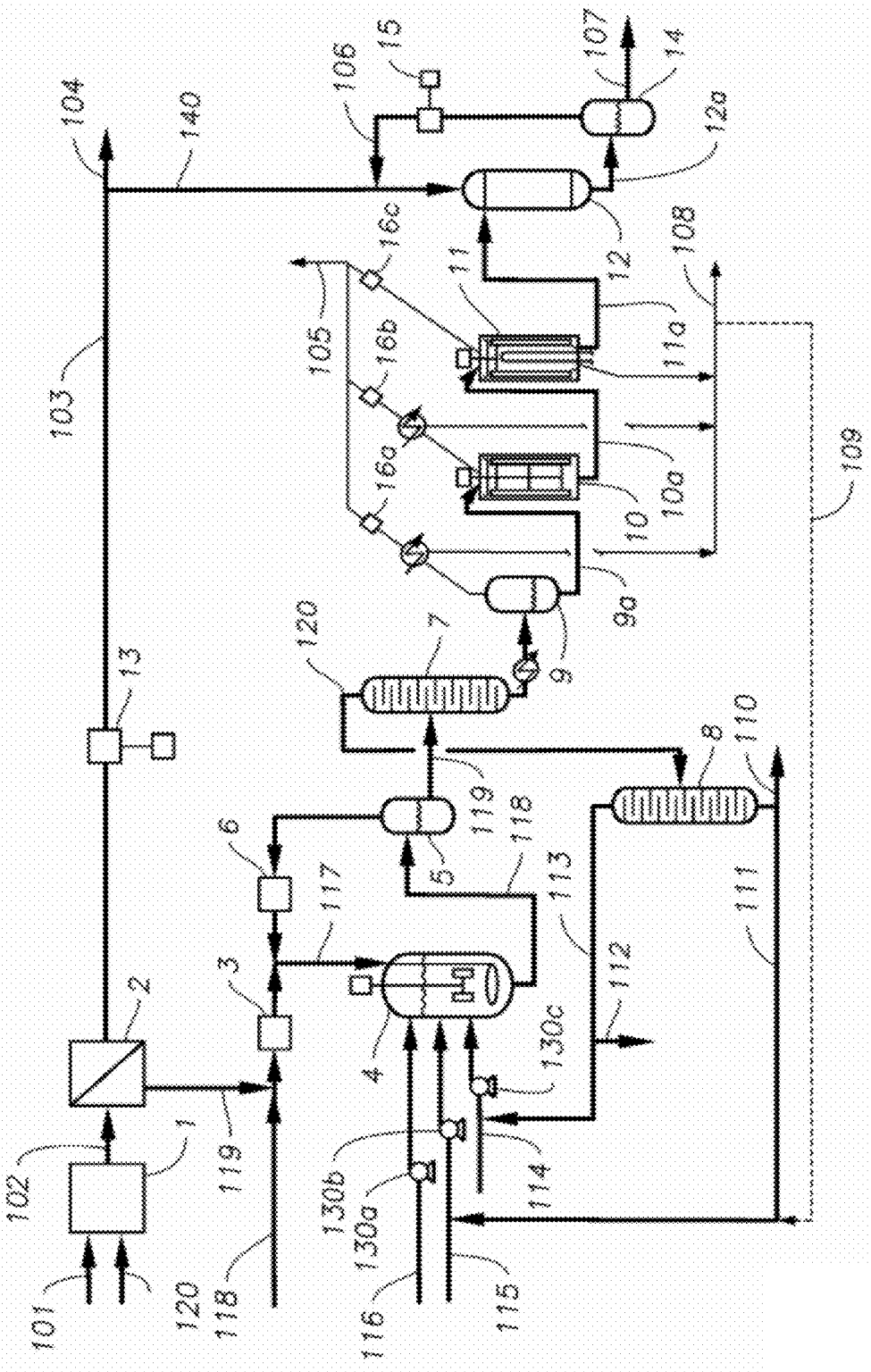
FIG. 6 is a schematic illustrating a system and process for manufacture of polyketones according to an embodiment of the present invention.

In the embodiment of the invention illustrated schematically in FIG. 6, a Partial Oxidation Unit (POX) 1 is used to generate CO and H$_2$ (syngas). The POX unit 1 is fed oxygen 101 along with steam cracked tar 120 or another suitable hydrocarbon, preferably a low value hydrocarbon stream. The syngas is then fed via conduit 102 to a membrane separation unit 2, to separate the CO from the H$_2$. Each of units 1 and 2 are per se known in the art. The CO flow is flow controlled by known methods (not shown) and then mixed via conduit 119 with the ethylene (C2=) provided through conduit 118 that is controlled with a separate flow controller (not shown). The CO/H$_2$ mixture is compressed to the desired reaction pressure in a feed CO/C2=compressor 3, which is per se conventional in the art, and introduced via conduit 117 to the polymerization reactor, 4, which is conveniently a Continuously Stirred Tank Reactor or CSTR, per se known in the art. The free radical initiator 116, typically an organic peroxide or H$_2$O$_2$, along with the butene (C4) 114 and solvent 115 (e.g., butane) are pumped to the reactor using separate feed pumps (130a, 130b, 130c, respectively). The residence time of the feed (in this embodiment, reactants CO, C2, and C4) in the reactor is determined principally by the reactor temperature and half-life of the initiator. One of ordinary skill in the art in possession of the present disclosure can determine residence time without more than routine experimentation.

Continuing with the embodiment of FIG. 6, the reactor effluent is fed through conduit 118 to a high-pressure separator, 5, where the unconverted CO/C2=are recovered, compressed in CO/C2=Recycle Compressor 6, per se known in the art, and then recycled back to the reactor 4. The product exiting the high pressure separator, 5, which may be a conventional high pressure flash drum, via conduit 119 is fed to a crude product stripper, 7, also per se known in the art, where the crude polymer is separated from the butene/solvent mixture. The crude polymer is then heated (shown by conventional figure on the conduit between 7 and 9) and fed to a polymer stripping section composed of vacuum flash drum 9, a wiped film evaporator 10, and a short path evaporator 11, each of which is known in the art per se and each of which removes portions of the polymer light ends; the light ends then is recycled to the reactor via conduit 105 (the connection of 105 to reactor 4 not shown for convenience of view). In addition or in the alternative, the light ends may be recycled to the reactor along the conduit indicated by dotted line 109). The light ends may also be purged from the system via conduit 108. Each of the paths indicated in this section may be independently or collectively controlled with the aid of the heaters shown by conventional symbols and/or compressors 16a, 16b, and 16c. The conduits between flash drum 9, wiped film evaporator 10, short path evaporator 11, to hydrofinisher 12, conduits 9a, 10a, 11a, respectively, convey the product polyketone which is then at least partially hydrogenated to the polyketone-polyol, as described below.

The polymer exiting the light ends stripping section comprising vacuum flash drum 9, wiped film evaporator 10 and short path evaporator 11 in FIG. 6 is fed to a hydrofinishing reactor 12, which is supplied with hydrogen for mild hydrogenation to remove the color from the polyketone and convert the polyketone to the polyketone-polyol product. The hydrogen for the hydrofinishing reactor is conveniently supplied from the membrane unit 2 (and/or other hydrogen sources not shown), after being compressed to desired pressure in hydrogen compressor 13. The effluent of the hydrofinishing reactor 12, conveyed through conduit 12a, is flashed at low pressure in a flash drum 14 to remove hydrogen, and then the product is sent to tankage via conduit 107. The hydrogen flashed out of the product polymer may be recycled back to the hydrofinishing reactor via hydrogen recycle compressor 15 along conduit 106. Unconverted butene and solvent leaving the product stripper 7 via conduit 120 are separated in the butene/solvent splitter, 8, and then recycled to the reactor via conduits 113 and 111, respectively, and/or purged via conduits 112 and 110, respectively.

One of the advantages of the process of the present invention is that disadvantaged feed streams may be used, as well as more pure feedstreams. Numerous disadvantaged hydrocarbon streams may be used other than steam cracked tar, e.g., more generally, products of a refinery pipestill or a chemical intermediate stream containing asphaltene or resid, such as atmospheric resid or vacuum resid. Deasphalted tar, such as discussed in WO2008027130, Raff-1, Raff-2, and combinations thereof, are also advantageous hydrocarbon sources. Also, advantageously the process of the present invention may be integrated with a refinery or a steam cracker in a chemical plant.

All polymers listed in the examples below, were prepared in the continuous mode using a continuous stirred tank reactor unit (CSTR). A schematic of the unit used is depicted in FIG. 6, which has been described in detail above. The numbers of the examples in following begin again at "Example 1" and thus it will be recognized that references to example numbers in the following are separate and distinct from those experiments described above. The unit consists of a 2-liter stirred autoclave that is equipped with multiple gas and liquid feed systems, gas sampling systems, and a back-end section comprised of accumulation vessels for collecting the product. The unit is typically operated in the continuous mode, but it can also operate in semi-continuous or batch mode. The autoclave is equipped with a baffle and a dip tube located half-way inside the vessel for discharging the product during continuous operations, a cooling coil, and a magnetically-driven stirrer that is typically operated at 1500 rpm. The autoclave is heated externally with a heating mantle and the temperature is controlled by automatically adjusting the flow of water/glycol fluid in the cooling coil. The feed system consists of gas and liquid feed metering devices. The gases, comprised of CO, ethylene, and methane, are metered into the reactor independently via Brooks mass flow controllers. The ethylene delivery pressure is set at 350-400 psig to keep it in the gas phase before entering the Brooks. The methane is used as a marker for measuring conversions. A small sample cylinder located downstream of the Brooks is used for collecting a feed gas sample for analysis. The feed gas is directed to the compressor and compressed to a pressure of 100 psig above the reactor set pressure, and then introduced into the autoclave via a gas sparger located near the bottom of the autoclave. A backpressure regulator installed down stream of the reactor was used to maintain a reaction pressure of 3000 psig. Three liquid feeds are used in the reaction: solvent, liquefied butene, and initiator solution. The solvent is pumped into the reactor at a rate of 24 ml/min via a reciprocating pump with a diaphragm sealed head (Whitey brand). The pumping rate is controlled by varying the stroke length. The butene, as purchased from the vendor, contains 10% butane used as internal standard. It is supplied from a tank equipped with a dip tube. A head pressure of ~100 psig nitrogen is used to keep the butene liquid. Two double-barrel dual-head diaphragm pumps (Milton Roy brand) are used to meter the butene into the reactor. The MEK and butene are introduced into the autoclave through the same port used for the gases. The third liquid feed is the initiator solution, typically 7 wt % of TBP in the solvent. This solution is fed to the reactor from syringe pumps (Isco brand) that are connected to the reactor via capillary tubing. The pump barrels and capillary lines leading to the reactor are externally cooled to ~0 C to avoid decomposition of the peroxide before it enters the reactor. The initiator solution is introduced into the reactor via a separate injection port located ~3" below the liquid level, whereas the gases and all other liquids are mixed upstream of the reactor and injected into the reactor through a sparger near the bottom of the reactor. In all examples, the initiator feed rate was kept at 4 ml/min. The back-end of the unit consists of two collection vessels, one for collecting liquids while lining out the unit and the other is for product accumulation and work up, and a wet test meter for measuring total off gas during the balance. An off-gas sample is collected for measuring conversion of various components. A glycol jacketed knockout (K—O) vessel is located upstream of the wet test meter (not shown in the schematic) to ensure the off-gas sample is free of liquid.

During start up, the unit is configured in the by-pass mode in which all liquids and gases go through a by-pass accumulator, per se known in the art. The compressor is turned on and set at ~3100 psig. The autoclave is first pressurized with CO at the desired pressure. The solvent is then pumped to the reactor at the desired flow rate until the liquid in the autoclave reaches the steady level set by the location of the dip tube. The CO, ethylene, and methane flows are then set while the solvent is flowing through the reactor. The backpressure on the autoclave is then set at 3000 psig. After all the flows reach steady state, a sample of feed gas is collected for analysis, and then the autoclave is heated to reaction temperature. The reaction temperature ranged from 175 to 190° C. After the set temperature is reached, the initiator solution (7.0 wt % of DBP in solvent) is introduced into the reactor. The unit is then allowed to equilibrate until a minimum of four turnovers elapse. The unit is then switched to the on-balance mode for the duration of the experiment, typically five hours. During the balance, a sample of the off-gas is collected for analysis. At the end of the balance time, the liquid accumulated in the on-balance vessel is recovered/weighed and the volume of the total off-gas is determined. The liquid recovered is distilled to remove the solvent leaving behind the polymer for subsequent analyses.

In the tables summarizing the examples, the following nomenclatures are used: (GHSV)=Gas Hourly Space Velocity accounts for only the CO and ethylene (C2) flows, and is calculated as follows: GHSV (CO+C2)=(CO flow in liter/hour+C2 flow in liter/hour)/2, where 2 is total reactor volume; CO/C2=CO flow rate/C2 flow rate; Butene (C4) mol/h=C4 in grams/mol wt of C4; C4/(CO+C2)=moles of C4/(moles of CO+moles of C2).

Sample Work-Up and Measurements: The reactor effluent is first distilled under vacuum at 80-85 C to remove the solvent. The resulting polymer is then subjected to five measurements:

Viscosity measured at 25° C. and expressed in cP

DSC to determine glass transition temperature (Tg) and percent crystallinity

13C NMR to measure the percentage of CO in the polymer and branching index (BI), expressed as number of branched per 1000 carbons.

TGA (Thermogravimetric Analysis) to measure volatility of the polymer at various temperatures and ambient pressure in air. The volatility listed in the tables represent percent weight loss at 160° C. in air.

GPC (Gel Permeation Chromatography) to measure the number-average molecular weight (Mn) and polydispersity (PD)

Results of examples using polar solvent—MEK as the solvent carried out at GHSV=75-300 hr$^{-1}$, CO/C2=0.1-2.0 molar, C4/(CO+C2)=0.13-1.14 molar, and T=165-220° C. are summarized in Table 1. Examples 1-16 and 20-24 are performed at 175° C. at various feed compositions and GHSV produced polymers with CO contents ranging from about 20 to about 30% and a maximum Mn of 547 g/mol.

Figure 3:
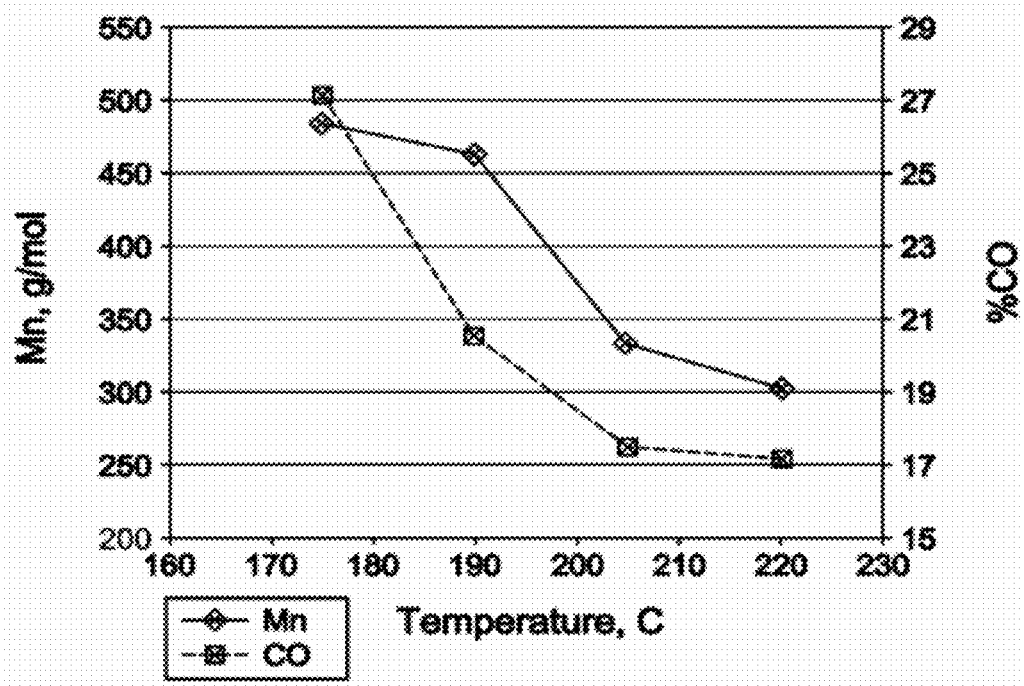
FIGS. 3 and 4 illustrate the influence of reaction temperature on various properties of polymers produced according to embodiments of the invention.

Influence of reaction temperature: raising the reaction temperature reduced the CO content and lowered Mn and Tg. This is illustrated in FIG. 3 using examples 4, 17, 18, and 19, all done at the same feed composition and GHSV, and temperatures from 175 to 220° C.

The examples listed in Table 1 show that polymers made in MEK are generally volatile, and that the volatility increases with increasing reaction temperature. As high as 35% light ends must be removed from the crude polymer to produce a liquid with acceptable volatility (~1% weight loss @ 160° C.).

Effect of butene: Examples 27 and 28 are performed without butene in the feed, both produced polymers that are still liquid at room temperature. The polymer volatility, however, is higher than materials made with butene in the feed.

TABLE 1

MEK Examples

| Example number | Note book number | Reactor conditions ||||| Crude polymer properties |||||||
|---|---|---|---|---|---|---|---|---|---|---|---|---|---|
| | | CO/C2 | GHSV | C4/(CO + C2) | C4 mol/h | Temp. C. | Solvent | Vis, cP | % CO | BI | Mn, g/mol | PD | Tg, C. | Volatility |
| 1 | 23711-56 | 1.0 | 150 | 0.38 | 4.74 | 175 | MEK | 73.0 | 24.8 | 184 | 401 | 1.5 | −79 | |
| 2 | 23711-74 | 0.5 | 75 | 0.38 | 2.37 | 175 | MEK | 16.8 | 24.4 | 233 | 291 | 1.43 | −94 | |
| 3 | 23711-60 | 0.5 | 225 | 0.13 | 2.37 | 175 | MEK | | 30.1 | 151 | 514 | 1.65 | −73 | 3.57 |
| 4 | 23711-62 | 0.5 | 225 | 0.38 | 7.12 | 175 | MEK | | 27.3 | 156 | 488 | 1.91 | −73 | 3.61 |
| 5 | 23711-77 | 0.5 | 75 | 1.14 | 7.12 | 175 | MEK | 17.1 | 22.4 | 244 | 306 | 1.43 | −95 | |
| 6 | 23711-64 | 2.0 | 225 | 0.13 | 2.37 | 175 | MEK | 125.7 | 26.7 | 184 | 361 | 1.54 | −75 | 9.44 |
| 7 | 23711-68 | 2.0 | 75 | 0.38 | 2.37 | 175 | MEK | 23.4 | 22.7 | 234 | 302 | 1.38 | −89 | |
| 8 | 23711-70 | 2.0 | 75 | 1.14 | 7.12 | 175 | MEK | 16.5 | 27.2 | 242 | 288 | 1.37 | −93 | |
| 9 | 23711-72 | 2.0 | 225 | 0.38 | 7.12 | 175 | MEK | 93.0 | 27.7 | 192 | 374 | 1.63 | −78 | 3.00 |
| 10 | 23711-80 | 1.0 | 150 | 0.38 | 4.74 | 175 | MEK | 71.0 | 27.3 | 177 | 428 | 1.58 | −80 | |
| 11 | 23711-113 | 0.50 | 150 | 0.38 | 4.75 | 175 | MEK | 68.0 | 22.7 | 197 | 402 | 1.69 | −83 | |
| 12 | 23711-115 | 2.00 | 150 | 0.38 | 4.75 | 175 | MEK | 54.0 | 21.8 | 202 | 358 | 1.49 | −82 | |
| 13 | 23711-119 | 1.25 | 225 | 0.25 | 4.75 | 175 | MEK | 61.3 | 23.0 | 195 | 547 | 1.31 | −81 | 8.12 |
| 14 | 23711-117 | 1.25 | 75 | 0.76 | 4.75 | 175 | MEK | 17.4 | 20.2 | 225 | 306 | 1.39 | −94 | |
| 15 | 23711-121 | 1.25 | 150 | 0.19 | 2.37 | 175 | MEK | 38.4 | 23.9 | 203 | 498 | 1.26 | −84 | 10.61 |
| 16 | 23711-123 | 1.25 | 150 | 0.57 | 7.12 | 175 | MEK | 43.2 | 20.0 | 213 | 362 | 1.4 | −84 | 5.32 |
| 17 | 23711-84 | 0.5 | 225 | 0.38 | 7.12 | 190 | MEK | 52.0 | 20.6 | 191 | 467 | 1.49 | −85 | 11.59 |
| 17-A | 24710-64-HC | 34% lights removed from 23711-84 ||||||  229.0 | 20.0 | 185 | 563 | 1.55 | −69 | 0.74 |
| 18 | 23711-102 | 0.5 | 225 | 0.38 | 7.12 | 205 | MEK | 20.9 | 17.5 | 227 | 333 | 1.46 | −95 | |
| 18-A | 23711-102-HC2 | 37% lights removed from 23711-102 |||||| | | | 502 | 1.27 | | 0.21 |
| 19 | 23711-104 | 0.5 | 225 | 0.38 | 7.12 | 220 | MEK | 14.1 | 17.2 | 253 | 305 | 1.38 | −99 | |
| 19-A | 23711-104-HC2 | 35.5% lights removed from 23711-104 |||||| | | | 403 | 1.32 | | 1.64 |
| 20 | 23711-109 | 1.00 | 300.00 | 0.38 | 6.33 | 175 | MEK | 173.0 | 27.6 | 178 | 435 | 1.66 | −75 | |
| 21 | 23711-148 | 0.10 | 225 | 0.13 | 2.42 | 175 | MEK | 23.7 | 20.1 | 189 | 400 | 1.54 | −97 | 15.6 |
| 22 | 23711-150 | 0.10 | 225 | 0.38 | 7.12 | 175 | MEK | 23.1 | 16.5 | 206 | 401 | 1.52 | −90 | 14.29 |
| 23 | 23711-149 | 1.00 | 225 | 0.13 | 2.42 | 175 | MEK | 20.7 | 27.7 | 171 | 452 | 1.52 | −78 | 3.86 |
| 24 | 23711-151 | 1.00 | 225 | 0.38 | 7.12 | 175 | MEK | 81.6 | 24.6 | 185 | 476 | 1.52 | −79 | 6.04 |
| 25 | 23711-158 | 0.10 | 225 | 0.38 | 7.12 | 165 | MEK | 157.2 | 23.7 | 173 | 512 | 1.56 | −83 | 4.77 |
| 26 | 23711-159 | 0.10 | 225 | 0.38 | 7.12 | 170 | MEK | 43.5 | 19.4 | 196 | 482 | 1.40 | −88 | 5.08 |
| 27 | 23711-160 | 0.10 | 225 | 0.00 | 0.00 | 170 | MEK | 151.5 | 26.4 | 165 | 443 | 1.74 | −92 | 11.95 |
| 28 | 23711-161 | 0.10 | 225 | 0.00 | 0.00 | 175 | MEK | 18.6 | 20.2 | 197 | 366 | 1.53 | −101 | 18.42 |

Figure 4:
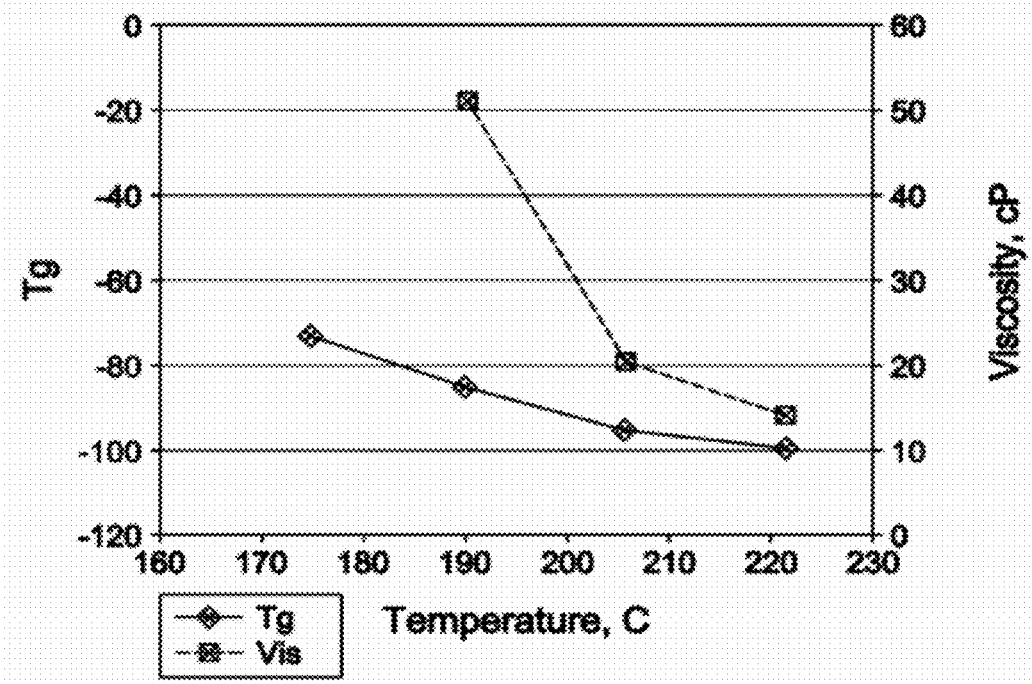
Figure 5:
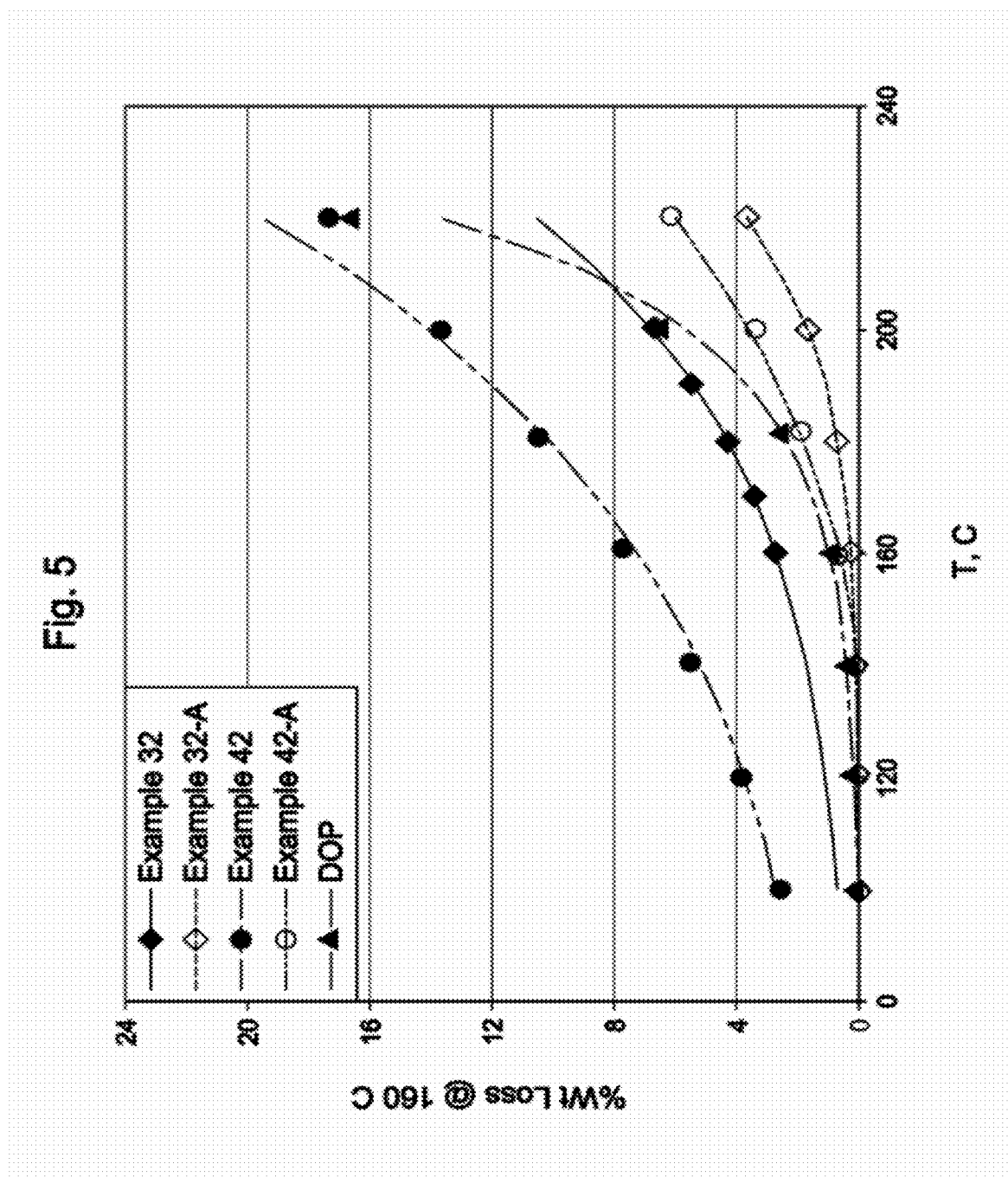
FIG. 5 compares volatility of polyketones according to embodiments of the invention with DOP (dioctyl phthalate).

Increasing the reaction temperature also reduced Tg and lowered the viscosity as illustrated by FIG. 4 using the same examples.

Results of examples using hexane as non-polar solvent are tabulated in Table 2. All examples were carried out at fixed GHSV=225 hr−1, CO/C2=0.5-1.0, C4/(CO+C2)=0.13-1.0, and T=172-190° C.

TABLE 2

Hexane Examples

| Example number | Notebook number | Reactor conditions ||||| Crude polymer properties |||||||
|---|---|---|---|---|---|---|---|---|---|---|---|---|---|
| | | CO/C2 | GHSV | C4/(CO + C2) | C4 mol/h | Solvent | T, C. | Vis, cP | % CO | BI | Mn, g/mol | PD | Tg, C. | Volatility |
| 29 | 23711-128 | 0.5 | 225 | 0.38 | 7.12 | Hexane | 190 | 150 | 12.5 | 221 | 559 | 1.3 | −79 | 2.34 |
| 30 | 23711-137 | 0.5 | 225 | 0.38 | 7.12 | Hexane | 175 | 425 | 17.9 | 183 | 675 | 1.95 | −71 | 2.22 |
| 31 | 23711-138 | 0.5 | 225.0 | 0.38 | 7.12 | Hexane | 175 | 334 | 17.0 | 189 | 630 | 1.75 | −73 | 3.56 |
| 32 | 23711-141 | 0.5 | 225.0 | 0.38 | 7.12 | Hexane | 175 | 738 | 17.4 | 179 | 602 | 1.88 | −68 | 1.98 |
| 32-A | 23710-100-HC | after removing 10% lights from 23711-141 (example 32) |||||| 874 | 17.8 | 169 | 896 | 1.55 | | 0.7 |
| 33 | 23711-133 | 1.00 | 225.0 | 0.38 | 7.12 | Hexane | 175 | 301 | 16.5 | 207 | 534 | 1.58 | −70 | 1.39 |
| 34 | 23711-135 | 1.00 | 225.0 | 0.13 | 2.43 | Hexane | 175 | 410 | 18.8 | 174 | 596 | 1.63 | −68 | 0.68 |

TABLE 2-continued

Hexane Examples

| | | Reactor conditions | | | | | | Crude polymer properties | | | | | | |
|---|---|---|---|---|---|---|---|---|---|---|---|---|---|---|
| Example number | Notebook number | CO/C2 | GHSV | C4/(CO + C2) | C4 mol/h | Solvent | T, C. | Vis, cP | % CO | BI | Mn, g/mol | PD | Tg, C. | Volatility |
| 35 | 23711-167 | 1.00 | 225.0 | 0.13 | 2.43 | Hexane | 175 | 414 | 19.2 | 180 | 622 | 1.58 | −67 | 1.23 |
| 36 | 23711-168 | 1.00 | 225.0 | 0.13 | 2.43 | Hexane | 172 | 534 | 19.2 | 181 | 652 | 1.62 | −67 | 1.66 |
| 37 | 23711-171 | 1.00 | 225.0 | 0.13 | 2.43 | Hexane | 175 | 304 | 20.5 | 170 | 559 | 1.77 | −71 | 4.36 |
| 38 | 23711-172 | 1.00 | 225.0 | 0.13 | 2.43 | Hexane | 180 | 362 | 18.4 | 174 | 542 | 1.74 | −71 | 3.74 |
| 39 | 23711-173 | 1.00 | 225.0 | 0.13 | 2.43 | Hexane | 185 | 125 | 21.4 | 174 | 565 | 1.81 | −71 | 8.23 |
| 40 | 23711-181 | 1.00 | 225.0 | 0.13 | 2.43 | Hexane | 175 | 189 | 16.8 | 199 | | | −73 | 2.80 |
| 41 | 23711-183 | 1.00 | 225.0 | 0.13 | 2.43 | Hexane | 175 | 149 | 17.6 | 196 | | | −77 | 6.00 |
| 42 | 23710-144 | composite of 23711-181 23711-183 | | | | | | 160 | 16.9 | 190 | 691 | 1.47 | −77 | 4.50 |
| 42-A | 23710-144-HC | after removing 10% lights from 23710-144-example 42 | | | | | | 324 | 16.7 | 185 | 719 | 1.42 | −69 | 0.47 |

The examples listed in Table 2 clearly show that using a non-polar solvent, such as hexane, produces polymers with higher Mn, higher viscosity, higher Tg, and lower volatility. As with MEK examples, raising the reaction temperature lowers the CO content, Mn, Tg, and viscosity (Examples 29 and 30). It is important to point out that raising the temperature has much higher impact on volatility of polymers made in MEK than those made in hexane. This comparison is illustrated by Examples 17 (MEK) and 29 (Hexane), both done at the same feed composition and 190° C.

Effect of solvent on viscosity and performance of stripped polymers: Polymers made using the current inventions are processed with PVC at elevated temperatures (150-170° C.). They must have very low volatility and remain liquids with reasonable viscosity at these temperatures. Example 17 done in MEK produced a polymer with a volatility of 11.8% and viscosity of 52 cP. To achieve acceptable volatility without harming the viscosity significantly, the light end fraction that is contributing to the high volatility must be removed from the crude polymer. In example 17-A, the crude polymer from example 17 was subjected to conventional distillation at 150° C. and 0.02 mmHg vacuum, where 34% light ends were removed. The remaining polymer showed a volatility of <1% and a viscosity of 229 cP. In contrast, the polymer of Example 42 made in hexane had a volatility of 4.5% and a viscosity of 160 cP. This polymer required the removal of only 10% lights to produce a material with acceptable volatility and reasonable viscosity (Example 42-A). Note that both polymers of Examples 17-A and 42-A have optimum CO content (17-20%) needed to satisfy the cold temperature flexibility target when the polymer is formulated into PVC/Polymer films. Non polar solvent, such as hexane, has the advantage of producing polymers that need less stripping and still meet volatility and plasticizer performance targets.

Volatility of crude and stripped polymers: The volatility of crude polymers from examples 32 and 42, and that of the corresponding stripped polymers of examples 32-A and 42-A were measured using Thermogravimetric analysis (TGA). The volatility, expressed as percent weight loss, at various temperatures is shown in FIG. 4. The Figure also includes the volatility of dioctyl phthalate (DOP) as reference. The stripped polymers show comparable or lower volatility than that of the DOP.

Hydrofinishing of OCO polymers: The polymers produced by the process of the invention are colored before the hydrogenation step. The color range from pale yellow to light amber depending on the operating temperature. The color is attributed to the presence of double bonds that are conjugate with the carbonyl group. Mild hydrogenation of the polymer over any standard hydrogenation catalyst is sufficient to saturate the double bond and eliminate the color. This is described in Example 43.

EXAMPLE 43

Hydrofinishing

A 30% solution of polymer from Example 32-A in tetrahydrofuran (THF) and a powdered hydrogenation catalyst (10% Pd supported on carbon) were charged to a 600 ml stirred autoclave. The amount of catalyst represents 2.5% of the actual weight of the polymer. The reactor was flushed several times with nitrogen, pressurized with hydrogen at 500 psig, and then heated at 100 C for 40 minutes. The reactor was then cooled to room temperature, depressurized and its content was filtered to remove the catalyst. The filtrate was place in a rotary evaporator to remove the THF. The resulting liquid polymer was white and showed essentially no double bonds (olefinic hydrogen) when analyzed by $^1$H NMR. Table 5 is a summary of NMR results of starting and hydrogenated polymers.

TABLE 5

$^1$H NMR Results of Crude and Hydrogenated Polymers

| Polymer | Carboxylic Acid H | Olefinic H | Aliphatic H | Color |
|---|---|---|---|---|
| Example 32 (starting polymer) | 0.01 | 0.90 | 99.04 | Amber |
| Example 43 (Hydrogenated polymer) | 0.00 | 0.04 | 99.87 | White |

Based on results of the above examples, a continuous process for the manufacture of OCO polymers as plasticizers is believed realized for the first time. The process consists of reacting CO with C2/C4 olefin mixture at high pressure/temperature in the presence of a solvent and a suitable free radical initiator. It is preferred to select a non-polar solvent to minimize the amount of light ends that need to be removed to meet volatility requirement while still obtaining a liquid polymer with acceptable viscosity and plasticizer performance. Refinery Raffinate-1 or Raffinate-2 may be used in the process. The butane in these streams functions as the non-polar solvent and the butenes as reactant.

In preferred embodiments the polyketone and/or polyketone-polyol plasticizer is used to flexibilize PVC. One of skill in the art will appreciate that the term "PVC" includes homopolymers of vinyl chloride as well as copolymers thereof containing up to about 20 mol % of other monomers including but not limited to vinyl acetate, propylene, ethylene, butyl vinyl ether, diethyl maleate, dimethyl fumarate, and the like. Numerous other polymer systems may plasticized, such as acrylic polymers, polyurethanes, nylon, polyolefins, fluoroplastics, and the like, as well as mixtures of the polyketone and/or polyketone-polyol compounds of the invention with such systems.

In more preferred embodiments, the formulation containing PVC resin, and one or more polyketone and/or polyketone-polyol plasticizer according to the invention used in amounts ranging from 10 to 80 part per hundred part of resin by weight (phr), together with optional but preferred components including epoxy heat stabilizer added in a range of 3-10 phr, a conventional mixed metal salt stabilizer used in amounts ranging from 1.5 to 4 phr, along with other additive such as conventional fillers (e.g., calcium carbonate in 0-100 phr), flame retardants (e.g., antimony trioxide added in 0-7 phr), lubricants (from 0 to 4 phr), colorants, dyes, UV stabilizers (all in amount of from 0 to 3 phr). One of ordinary skill in the art in possession of the present disclosure would be able to select the appropriate conventional additives by routine experimentation.

Additionally, the plasticizers according to the present invention may be supplemented by or be used to partially replace with known plasticizers such as dialkyl phthalates, dialkyl isophthalates, dialkyl terephthalates, benzoates, cyclohexanoates, trialkyl trimellitates, adipates, and the like in polymer systems described herein, particularly PVC systems.

In a preferred embodiment the epoxy stabilizer, when used, is selected from at least one of epoxidized soybean oil, epoxy tallate esters, glycidyl esters, and polymeric epoxides.

When using suspension PVC resins, in an embodiment the formulations can be prepared by first dry mixing the solid ingredients, then under low shear, mixing in the liquid components. This mixture, termed a wet blend, is then mixed on a hot roll mill at 330° F. for 6 minutes, followed by compression molding at 340° F. for 10 minutes. Under high shear conditions, the formulation would yield a dry blend. Dryblends can be further processed by calendering, extrusion, injection molding, spraying, and rotomolding.

When using paste or emulsion PVC resins, in an embodiment plastisols may be prepared by slow addition of the liquids under moderate shear to the solids. Mixing is continued until a homogeneous emulsion is obtained. The plastisol is further processed by spreading on a flat substrate, then heating at 190 C for 3 minutes or by pouring into a mold and heating at 190° C. for 3-6 minutes, depending on the thickness of the test sample. Plastisols can also be processed into flexible PVC articles by dipping, casting, molding, and spraying.

Standard plasticizer blending techniques, well known to those skilled in the art, may be used, such as adding the plasticizers to the resin on hot rolls or in a hot mixer such a Banbury. In embodiments, the invention is an article produced from a resin or polymer such as PVC, such as described above, made into a film or sheet, or by extrusion, molding, casting, and the like.

Laboratory testing is by standard techniques, using ASTM procedures, such as identified those identified in U.S. Pat. Nos. 6,982,295 and 6,969,736. One important aspect of this invention is the balance between compatibility and low temperature flexibility. Compatibility with PVC can be increased through the increase of carbon monoxide content. These polar groups interact with the polar groups of the PVC, creating van der Vaals attraction forces, keeping the plasticizer from exuding. However higher levels of carbon monoxide make this attractive force too strong, resulting in a plasticizer that is closely associated with the PVC backbone, thus having less molecular motions, and consequently yielding poorer performance in low temperature flexibility. Here we found that as the CO content is decreased to a certain threshold, around 18 wt %, the low temperature flexibility increases. However, there is a limit in how low the carbonyl content can be reduced. The lower limit of carbonyl content is defined by exudation. As the CO content is decreased below 17 wt %, compatibility problems develop and the usefulness of the plasticizer diminished.

An alternative approach to decreasing the miscibility of the plasticizer, while improving the low temperature characteristics is to chemically modify the plasticizer in order to partially convert the compatibilizer carbonyl groups to less compatible functionalities. In a preferred embodiment, there is an additional step of hydrogenation used to partially convert some of the carbonyl (CO) groups to alcohol (C—OH) groups. This conversion improves color, decreases the plasticizer compatibility and improves the low temperature flexibility. In the preferred embodiment, a part of the as-prepared CO content is converted to C—OH groups so that the remaining carbonyl content is between 18 and 25 wt %. Stating another way, 0-30 mol % of the original CO content is converted to C—OH (with higher OH containing materials requiring higher remaining CO groups to keep the plasticizer from exuding). Other technologies that could be practiced would be conversion of the carbonyl groups to other, less PVC-miscible entities, amines, substituted amines or acids. The preferred embodiment would be the partial conversion of the as-prepared carbonyl content to alcohol, ester, amines or substituted amines.

The improvements in low temperature flexibility can be observed through DMTA measurements, and data is available in a number of reports and presentations, showing that as the plasticizer compatibility with PVC is decreased, the width of the DMTA tan δ peak also increases. Thus a correlation between peak with and low temperature performance exists. As compatibility is increased through higher CO, the tan δ peak width decreases. In addition, as the compatibility of the plasticizer is decreased through changes to the chemical composition, as noted above, to where a secondary peak begins to develop on the low temperature side of the peak, compatibility problems will then be observed in the plasticized sample.

General plasticizer performance prediction tools such as Hansen's or Small's solubility parameters show little differences here as being useful to predict low temperature performance. Although not completed at present, it is expected that the Ap/Po ratio of Veersen/Meulenberg could be yet another characterization tool, using correlations developed in this work.

Another important aspect of the invention is the balance between viscosity and volatility, primarily determined by the average molecular weight. When the molecular weight is increased, the glass-transition temperature (Tg) of the plasticizer increases and the cold temperature flexibility/performance of the plasticizer decreases. The processability of the plasticizer also decreases with products of increased molecular weight. Higher molecular weight materials also have concerns about haze formation and poor pour points. If the molecular weight is too low, then high emissions during processing, unacceptable weight losses upon aging, compatibility as indicated by plasticizer exudation all become issues. Stripping of the low molecular weight or high molecular weight components as a means of achieving narrower molecular weight distribution and thus improved permanence and cold flexibility leads to a yield loss. Such yield losses cannot be high for economic reasons. Thus, in order to minimize the balance between yield loss, plasticizer performance, and plasticize processability, the number-averaged molecular weight of the raw product made in the olefin-CO polymerization step needs to be in the 600-1000 g/mol, preferably in the 750-850 g/mol range.

Another aspect of the process of producing olefin-CO plasticizers is hydrotreatment. The plasticizer as produced in the polymerization reactor has high color (yellow to brown), that increases even further upon processing, such as stripping of the lights. The plasticizer also has a mild-sweet odor. To be useful as a plasticizer, the polyketone plasticizer needs to have low color and low odor. Hydrotreatment, as described herein, improves these properties.

With regard to characterizations described herein, Molecular Weight determinations were measured by gel permeation chromatography (GPC) calibrated with polystyrene standards and Differential Scanning Calorimetry (DSC) was used to measure the glass transition temperature, Tg. Additional characterization details can be found in U.S. Pat. Nos. 6,156,872; 6,262,225; 6,541,586; and 6,642,328.

OLEFIN-CO POLYMER synthesis in batch autoclaves: The products were prepared in 300-mL or in 1000-mL Autoclave Engineer's batch autoclaves at 4.8 MPa (700 psi) or 20.7 MPa (3000 psi), respectively. The solvents (distilled under nitrogen, delivered in SureSeal™ bottles) were purchased from Aldrich and were used as received. All reactor charges were prepared in a nitrogen-purged glove box to exclude air. Butenes were charged into the 1000-mL reactor by dissolving them in the solvent. The reactor was purged with nitrogen before each experiment to exclude air. In some early experiments, the presence of air resulted in variable yields. The reactor was charged with the solvent and the monomers under nitrogen, then was heated to the reaction temperature.

The reaction was initiated by injecting a solution of an initiator, such as tert-butyl peroxide (TBP), or tert-butyl peroxyacetate, tert-butyl peroxy-2-ethylhexanoate, $H_2O_2$, etc. The organic peroxide initiators were obtained either from AKZO as free samples or were purchased from Aldrich. The initiator-containing solution was either injected from a bomb with the aid of the feed gas or was pumped into the reactor using an ISCO pump. In the former case, the reactor pressure was brought to its final value at the time of the injection of the initiator solution. In the latter case, the reactor was at the final temperature and pressure before the addition of the initiator solution began. The 10-30 ml initiator solution was pumped into the reactor in 2-15 min. The reaction pressure was maintained by continuously feeding a blend of CO and ethylene or pure CO through a pressure regulator valve into the reactor from a volume-calibrated PVT tank.

Depending on the half-life of the initiator at the reaction temperature, the reactor was held at the reaction temperature for an additional 30 min to ~12 h (overnight) after finishing the addition of the initiator. After the gas consumption stopped, indicating the end of the reaction, the reactor head gas was vented and the product liquid was drained into a collection vessel. The reactor was washed after each run with an oxygenate solvent, like non-stabilized THF if the reaction solvent was hexane or the reaction solvent itself if it was a ketone. Oxygenates are better solvents for polyketones than alkanes and ensured the recovery of waxy product fractions sticking to the reactor internals. The product was recovered by removing the solvent from the liquid reaction product and from the washing liquid at 60 C and 120 mbar pressure using a Rotavap distillation equipment. The MW of the products was determined using gel permeation chromatography (GPC) with polystyrene calibration standards. Note that polystyrene calibration does not afford absolute MW values. The CO content of the polymer was measured using $^{13}C$ NMR analysis.

When using the 1000 mL autoclave, the molar feed composition was determined from the following inputs:

Solvent and $C_{4+}$ olefin (the latter dissolved in the solvent): direct weights.

Other condensed-state reagents (additives, comonomers, etc.): direct weights.

Initiator: direct weights when injecting from a bomb or from the volumes and densities (at ambient temperature and reaction pressure) of the stock solution injected into the reactor by the ISCO pump.

Ethylene and CO: density changes of the feed ethylene-CO blend in a volume-calibrated PVT vessel (equipped with a thermometer and a digital pressure gauge) calculated by using proprietary software or by using correlations established by PVT calibrations obtained with different feed blends.

When mass balances were required, the stirred reactor was slowly vented via a wet test meter into a 150-L sample bag, from which aliquots were analyzed by gas chromatography. In order to obtain good mass balance values, the gas content of the 150-L gas bag was thoroughly mixed before sampling by pushing the gas from side to side within the bag. Since the gas left in the reactor and in the vent lines was highly enriched in butene, it was sampled and analyzed separately. The free gas volume of the reactor was calculated from the difference between the reactor volume and the liquid recovered from the reactor. The volume of the PVT tank, reactor, and transfer lines were calibrated by using gas volumetric methods. The discharged liquid product was weighed and analyzed by gas chromatography using n-decane internal standard added to the sample before analysis.

COMPOSITIONAL ANALYSIS BY NMR: NMR analysis conditions for olefin-CO polymers and the measurement of product branching: Carbon NMR analysis is one of the key characterization methods for olefin-CO plasticizers. Because of the presence of non-protonated carbons, $^{13}C$ NMR was chosen as a primary structural characterization tool. Carbon NMR gives the weight-percent CO content (and its distribution as ketone, ester/acid, or alcohol/acetal), mole-percent of carbon present as olefin, and concentration/distribution of short chain branch types. For each polymer, we calculated the concentrations for methyls on branches or chain ends in terms of methyls per 1000 carbons. These were broken down as $CH_3$'s from ketone-bonded ethyls or geminal diethyls (7-10 ppm), $CH_3$'s from ethyl branches (10-13 ppm), $CH_3$'s from propyl and longer branches (13-15 ppm), and $CH_3$'s pendant to the polymer backbone (15-20.5 ppm). The numbers tabulated as branches also include contributions from chain ends, which are not spectroscopically resolved from methyls in branches. Note that in low molecular weight polymers, the chain-end contribution can represent a substantial fraction of the total. Carbon NMR can also quantify residual tetrahydrofuran, as well as BHT antioxidant remaining after evaporation of stabilized THF.

The carbon samples were typically prepared in chloroform-d, at approximately 15-20 weight-percent concentration. The chloroform used had been doped with 15 mg/ml chromium acetylacetonate ($Cr(acac)_3$) relaxation agent to accelerate the rate of data acquisition. On the order of 10000-14000 scans were co-averaged for the carbon spectra under quantitative conditions. A 90-degree carbon pulse was employed with a 3-4 second pulse delay, and inverse-gated proton decoupling.

Analysis protocol for determining Olefin-CO polymer COMPOSITION and STRUCTURE: Since the polymer properties (viscosity, crystallinity, miscibility, etc.) depend more strongly on CO content than on the relative $C_2/C_4$ olefin concentration, we simplified the analysis protocol to give weight-percent CO, and weight-percent olefin. These values are readily derived from the CO (comprising ketone, ester, acid, acetal, and alcohol groups) integrals, and the aliphatic integral (comprising all olefins). The weight-percentage composition is readily calculated, since each CO moiety weighs 28 g/mol, and each aliphatic carbon weighs 14 g/mol (assuming all aliphatics, on average, to be $CH_2$ groups). The weight percentage calculation does not suffer from the error introduced by the normalization required for mol-percent compositions.

The CO content is further broken down by mole-percent into ketone (chemical shift 200-215 ppm), acid/ester (160-185 ppm), acetal (98-105 ppm), and alcohol (60-75 ppm, corrected for THF contributions). Ultimately, a properly executed mass balance will give more satisfying results for $C_4$ inclusion than the indirect NMR protocols described herein. In any case, the effect of $C_4$ on polymer properties is most likely subsumed in the short chain branch distribution, which is calculated separately from composition, and performed under all of the methods.

The breakdown of the total weight-percent oxygenated carbon into subtypes (most importantly ketone vs. alcohol) is instrumental in characterizing materials that have been hydrogenated—either selectively to remove color bodies or more extensively to partially convert the carbonyl content to alcohol.

Analysis protocol for determining ethylene, CO, and isobutene contents: There is no definitive way to differentiate ethylene and isobutene contributions in the aliphatic intensity of the spectrum, but if such information is sought, there are two regions that have been assigned to isobutene-based carbons. The peaks at 50-56 ppm agree with methylenes sandwiched between CO groups and isobutene quaternary carbons. The geminally disubstituted methyls from isobutene are expected to resonate between 26-28 ppm. Examination of sixteen early syntheses of butene-free ethylene/CO spectra indicated that other structures also resonate in these regions, presumably because of the ethylene-based branching which occurs during polymerization.

We therefore attempted to establish a baseline contribution to these regions from a series of ethylene-CO polymers studied earlier, and to correlate their intensity to some other features readily integrated in the spectrum. Correlation with CO content and with total aliphatic content proved poor, but there did appear to be at least a fair correlation with the total aliphatic branching (methyl, ethyl, ethyl-ketone, and propyl+). The results of the correlation indicate that the 26-28 ppm region must be corrected by about 0.31 times the summed branch methyl area. The 50-56 ppm region must be corrected by about 0.19 times the summed branch methyl area.

Figure 7:
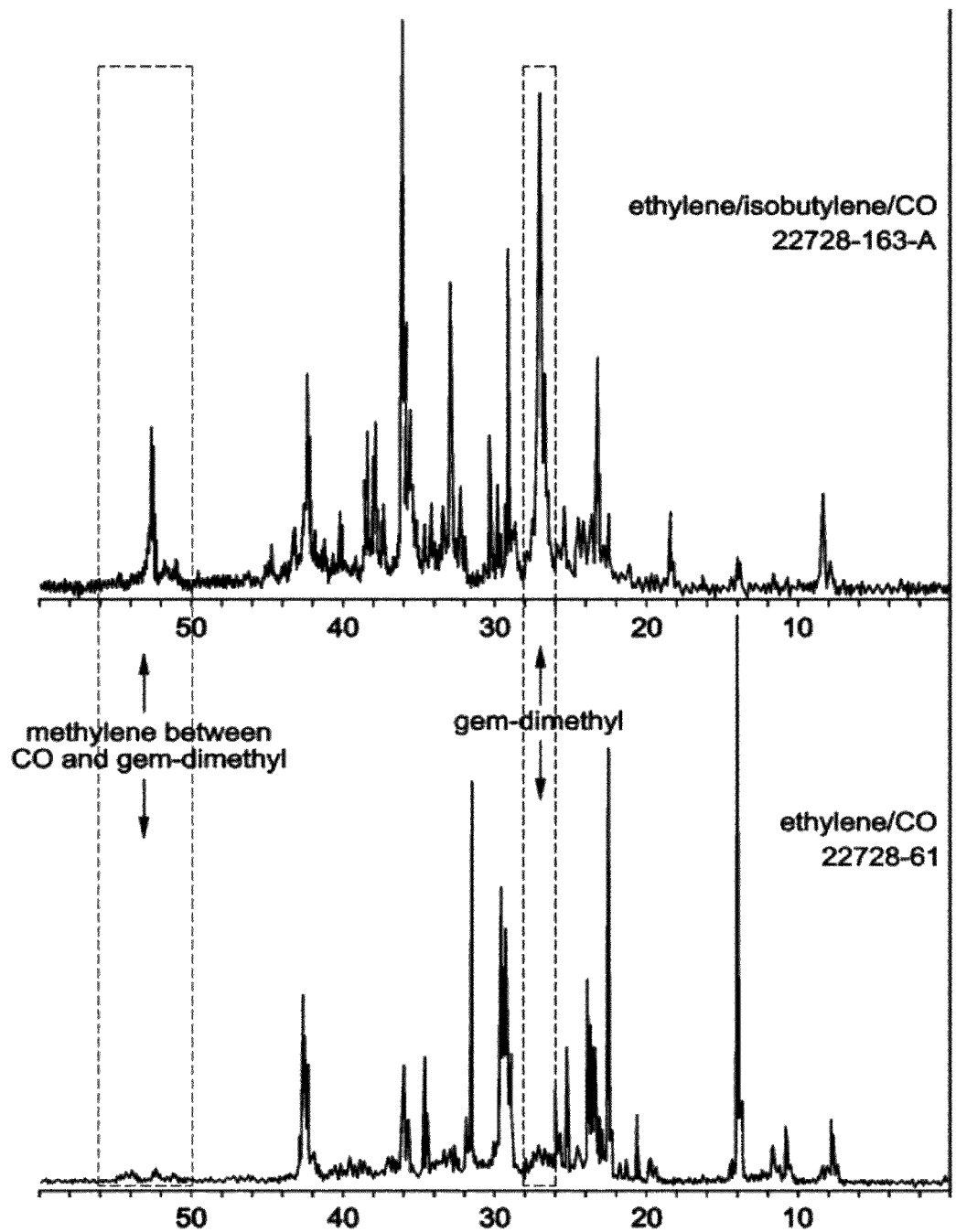
FIGS. 7 and 8 illustrate IR spectral features found in embodiments of the present invention.

In early analyses, mol-percentage concentrations were calculated for each component. Since the $C_2$ and $C_4$ monomers contribute different numbers of carbons to the spectral integrals, error in the $C_2/C_4$ split will, by necessity, introduce error into the CO content. Since the carbonyl carbon is unambiguously quantifiable, we therefore later modified the protocol so that the weight-% CO is carried directly through the calculation to the final distribution. The aliphatic content is then apportioned to ethylene and isobutene. To calculate the monomer mol-percent composition, the CO content is measured directly from the carbonyl intensity, and the ethylene content is derived from the remainder of the aliphatic intensity that is not assigned to isobutene. Since we have no basis for choosing the 50-56 ppm isobutene measurement over the 26-28 ppm measurement, we present the composition derived by averaging the two methods. A comparison of ethylene-CO and ethylene-isobutene-CO copolymers with the relevant spectral regions is shown in FIG. 7.

Figure 8:
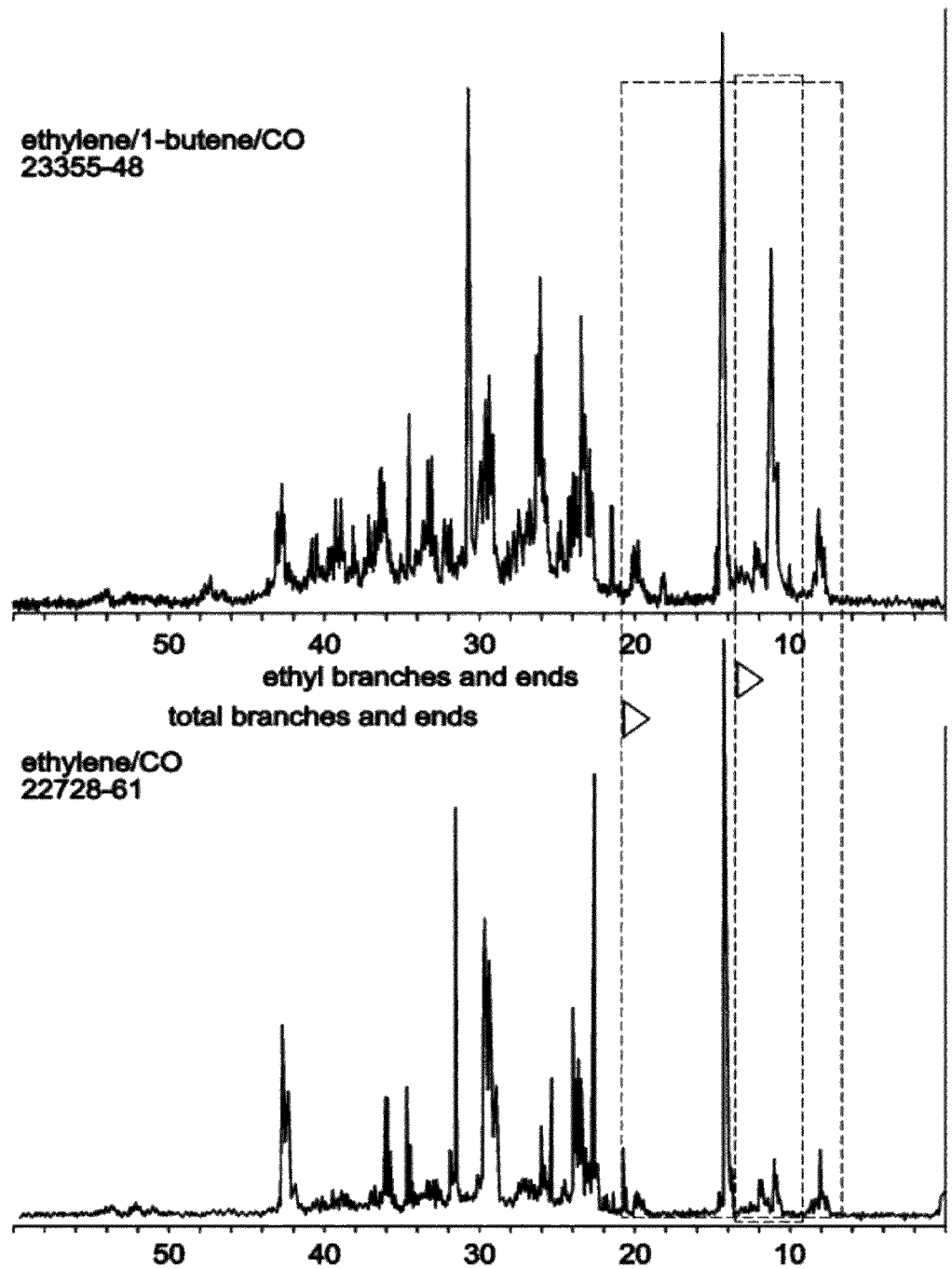
Figure 9:
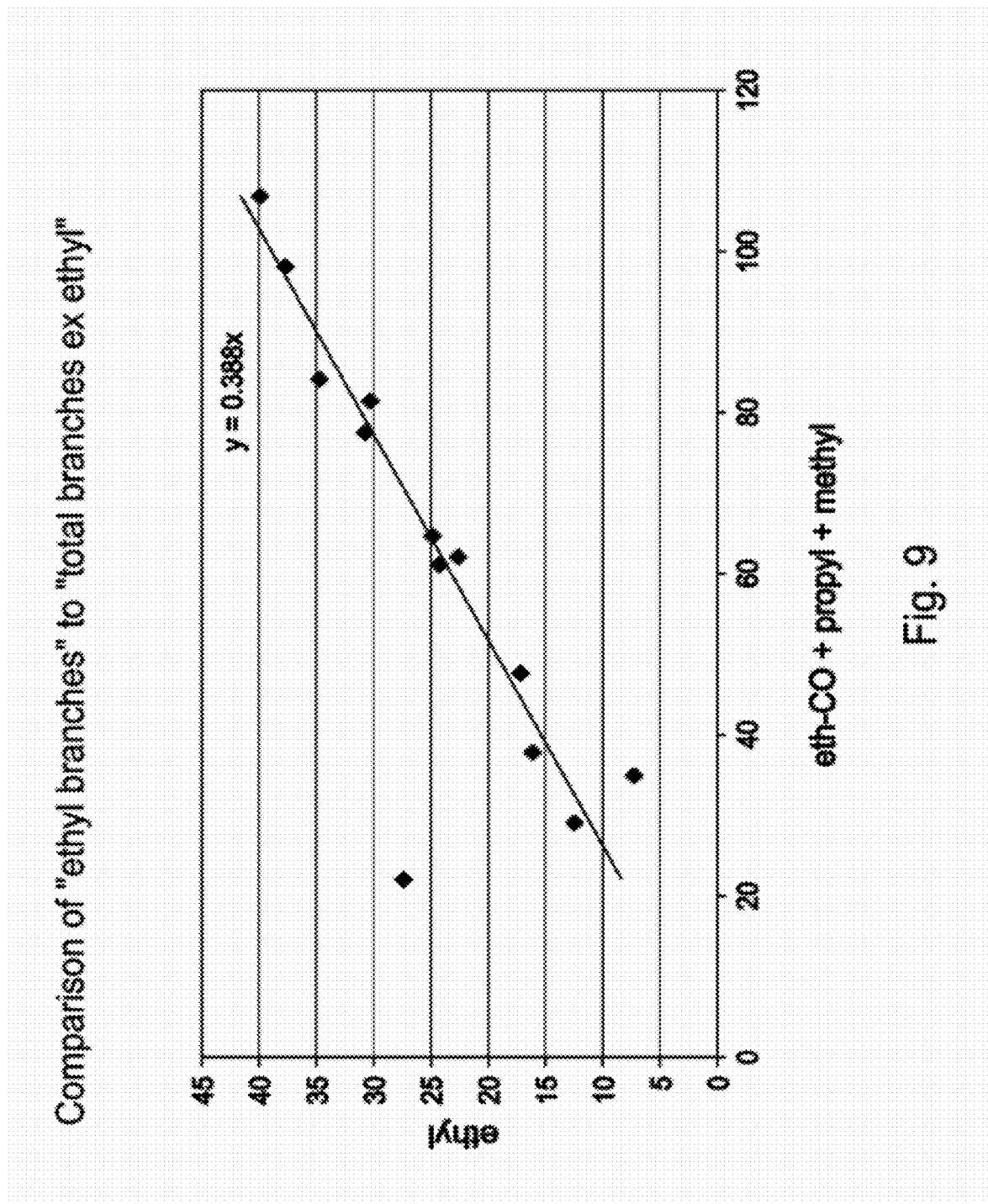
FIG. 9 is a correlation of data used to determine particular branching characteristics for embodiments of the invention.

Analysis protocol for determining ethylene, CO, and 1-butene contents: In analogy with isobutene content in ethylene-isobutene-CO polymers, there is no way to differentiate ethylene and 1-butene contributions to the aliphatic intensity in the spectra of ethylene-1-butene-CO materials. Therefore, we developed a protocol for determining compositions similar to that for the ethylene-isobutene-CO polymers. Using the branching distributions from ethylene-CO copolymers 22728-42 through 22728-77, we performed a regression to determine the concentration of ethyl branches that would be expected (from ethylene) for a given amount of methyl, propyl+, and ethyl ketone branching. Any excess beyond this level measured in the ethylene-1-butene-CO polymers is then assigned to 1,2-addition of 1-butene. The correlation plot for these data is shown in FIG. 8.

For both 1-butene- and isobutene-containing materials, these methods become unreliable when butene concentrations drop to the few percent levels, or when the polymerization conditions change in a manner that changes the baseline branching distribution. We therefore ultimately settled on quoting a CO concentration (in weight percent), and an olefin concentration (in weight percent) without braking the olefin content into ethylene and 1-butene. The CO content calculated in this way derives without assumptions from the spectrum.

MOLECULAR WEIGHT (MW) AND MOLECULAR WEIGHT DISTRIBUTION (MWD) BY GEL-PERMEATION CHROMATOGRAPHY (GPC): MW and MWD were determined by GPC using polystyrene calibration standards following the method given below:

TABLE 6

GPC Conditions Record Sheet

| | | |
|---|---|---|
| INSTRUMENT# 30 | | Waters Alliance 2690 HPLC |
| COLUMN | Type: | 3 Mixed Bed type "D" |
| | | 5 μm particle size |
| | Length: | 300 mm |
| | ID: | 7.5 mm |
| | Supplier: | Polymer Laboratories |
| SOLVENT PROGRAM | Type: | 100% tetrahydrofuran un-inhibited (THF) (kept under gentle He sparge) |
| | Supplier: | EMS catalog #: em-tx0279-1 |
| | Flow Rate: | 1 ml./min. |
| DETECTOR | A: | Waters 484 tunable UV @ 215 nm λ |
| | B: | Waters 2410 Refractive Index |
| TEMPERATURE | Injector: | 30° C. |
| | Detector: | 30° C. |
| | Column's: | 30° C. |
| INJECTION VOLUME | | 100 μl |
| SAMPLE CONCENTRATION | | 0.6 w/v %, (6 mg./ml.) |
| SOLVENT/DILUENT | | THF |
| DATE | | Dec. 18, 2002 |

It is understood that MW determined by the above method will not deliver absolute values since the calibration standard is not a polyketone.

Thermal Characterization of Olefin-CO Products.

Differential scanning calorimetry (DSC): Differential scanning calorimetry (DSC) was used for measuring phase behavior. All measurements were carried out using a TA Instruments MDSC 2920 at a constant cooling and heating rate of 10 C/min using nitrogen as a purge gas. Typically, sample mass ranged between 5-10 mg and all measurements were carried out in standard encapsulated aluminum pan. Temperature was calibrated with NIST standards and checked against indium. Heat flow was calibrated with indium standard. Accuracy of temperature was within ±0.2 C and heat of fusion was within ±1%. Samples were analyzed in an as-received state (first heating) and also evaluated after crystallizing them from the melt at a controlled cooling rate of 10 C/min (second heating). In a typical experiment, the as-received sample was cooled to −130 C and heated at 10 C/min to determine its glass transition and melting behavior. This heating step was followed by a controlled cooling at 10 C/min to −130 C to allow the sample to completely crystallize and cool to below its glass transition temperature. Melt-crystallized samples were subsequently heated at 10 C/min to evaluate their phase behavior.

Dynamic Mechanical Thermal Analysis (DMTA): the glass-transition temperature ($T_g$) and storage modulus (E') were measured using dynamic mechanical thermal analysis (DMTA). This analysis provides relaxation data on small-strain mechanical response of a sample as a function of temperature over a temperature range that includes the glass transition region and the visco-elastic region. A three-point bending configuration (TA Instruments DMA 2980) was used for all experimental measurements. A solid rectangular compression molded bar was placed on two fixed supports; a movable clamp applied a periodic deformation to the sample midpoint at a frequency of 1 Hz and amplitude of 20 μm. The sample was initially cooled to −130° C. then heated from −130 C to 60 C at a heating rate of 3° C./min. The output of these DMTA experiments is the storage modulus (E') and loss modulus (E"). The storage modulus measures the elastic response or the ability of the material to store energy, and the loss modulus measures the viscous response or the ability of the material to dissipate energy. Tan δ is the ratio of E"/E' and gives a measure of the damping ability of the material. The beginning of the glass transition (or β-relaxation) is identified as the extrapolated tangent to the Tan δ peak. The peak temperature and breadth of the peak are also measured to more fully characterize the transition from glassy to visco-elastic region. Breadth of the broad glass transition is discussed using another performance indicator, the difference between the temperature at which blends have some mechanical strength (100 MPa) and the onset of $T_g$.

Trade names used herein are indicated by a ™ symbol or ® symbol, indicating that the names may be protected by certain trademark rights, e.g., they may be registered trademarks in various jurisdictions.

All patents and patent applications, test procedures and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, the following preferred embodiments are not intended to be limiting: a composition comprising at least one liquid, random, aliphatic polyketone (or at least partially hydrogenated product thereof) prepared from at least one vinyl monomer and carbon monoxide and having at least one of the following characteristics: (a) Tg <−50° C.; (b) volatility <1% at 160° C.; (c) color of less than 50 Pt/Co (by ASTM D-1209 test method for Color of Clear Liquids (Platinum-Cobalt Scale); (d) olefinic carbon content of <1 mol %; (e) viscosity at 25° C.<1500 cP; or the aforementioned characterized by two or more, preferably three or more, more preferably four or more, still more preferably all five of the characteristics (a)-(e); or at least one liquid, random, aliphatic polyketone prepared from at least one vinyl monomer and carbon monoxide and having at least one, or two, or three or four, or five, or all six of the following characteristics: (a) copolymers of ethylene, butene, and carbon monoxide, more preferably, in embodiments and particularly for use as plasticizer for PVC, the polyketone compounds preferably are comprised of 53-80% ethylene, 15-25% or more preferably 16-25% or still more preferably 17-25% carbon monoxide, and 5-20% or more preferably 10-20% butene monomer units (thus the percentages are mol %); (b) number-averaged molecular weight be from about 600 to about 1000 g/mol, preferably 750-850 g/mol. With higher molecular weight, the product has higher glass-transition temperature; (c) the presence of olefinic hydrogen is preferably less than 1 mol %, still more preferably <0.1 mol %, as measured by proton nuclear magnetic resonance ($^1$H NMR); (d) light ends content is preferably less than 1 wt. %, as measured at 160° C. by thermogravimetric analysis (TGA), which is the cumulative weight loss in TGA at 10° C./min heating rate under flowing $N_2$; (e) the viscosity at 25° C., should be less than 1500 cP, more preferably less than 1100 cP; (f) a density ranging from about 0.91 to about 0.96 g/ml at 25° C.; and also any the aforementioned compositions modified by at least one additional plasticizing material selected from the group consisting of phthalic acid esters, adipic acid esters, trimellitic acid esters, cyclohexanoates, cyclohexane dicarboxylic esters, and benzoates, and also any of the foregoing compositions having as the polymer system a material selected from polyvinyl chloride, polyvinyl butyral, acrylic polymers, methacrylic polymers, poly(vinyldiene chloride), nylon, polyolefins, polyurethanes, and fluoroplastics; and also any of the aforementioned compositions with one or more stabilizers, fillers, lubricants, foaming agents, viscosity modifiers, pigments, and mixtures thereof; and more specifically any of the aforementioned embodiments characterized by at least one polyketone compounds prepared from monomer units of ethylene, carbon monoxide, and at least one butene, even more particularly wherein said at least one polyketone compound comprises 53-80 wt % ethylene, 16-25 wt % carbon monoxide, 10-20 wt % butene; and also any of the aforementioned wherein the compound is characterized as containing 0-30 mol % oxygen, relative to all the oxygen present in said at least one polyketone compound, in C—OH groups, as measured by $^1$H or $^{13}$C NMR; and also any of the aforementioned compositions further comprising an epoxide-containing compound selected from epoxidized soybean oil (ESO), epoxy esters, epoxide polymers (EPAL), and mixtures thereof; and also any of the aforementioned compositions, further comprising a major amount of PVC and wherein the total amount of plasticizer is about 1-100 parts, preferably 30-80 parts; and/or further comprising heat stabilizers selected from at least one of the mixed metal salts of barium/zinc and calcium/zinc, and organo-lead compositions, and/or further comprising fillers, preferably calcium carbonate, particularly having fillers added in the amount of 5 to 120 parts, preferably 20-70, more preferably 30-50 parts, by weight per hundred parts of resin, and/or further comprising additives selected from UV absorbers, antioxidants, colorants, fungicides, lubricants, and mixture thereof, added in the amount of about 0.2 to 5 phr range per additive, by weight per hundred parts of resin. In preferred embodiment, any of the aforementioned compositions may be further characterized as comprising a liquid, random, aliphatic polyketone/polyol characterized by unsaturation content of <1%; and/or at least one liquid, random, aliphatic polyketone/polyol characterized as being prepared from at least one vinyl monomer and carbon monoxide, and having a volatility <1% at 160° C.; a color of less than 50 Pt/CO, and an unsaturation content of <1%, particularly wherein said polyketone/polyol is further characterized as a number-averaged MW of 600-1000 g/mol; and or said polyketone/polyol is further characterized as comprising ethylene, butenes, carbon monoxide monomer units; and/or said polyketone/polyol is further characterized as comprising 53-80 wt % ethylene, 16-25 wt % carbon monoxide, 5-20 wt % butene, with a number-averaged MW of 600-1000 g/mol, having a Tg <−50 C, before hydrogenation, where during hydrogenation 10-30% of the carbonyl groups are reduced; and also a composition comprising at least two compounds characterized by any of the aforementioned characteristics and differing in at least one of them, particularly wherein one of the compounds in a polyketone and the at least one other is a polyketone-polyol. In preferred embodiments, the invention is also directed to a batch, semi-batch or continuous process comprising free radical copolymerization of one or more vinyl monomers and carbon monoxide including contacting a feedstream comprising said one or more vinyl monomers with a feedstream comprising carbon monoxide in a single reactor in the presence of a free radical initiator and oligomerizing said at least one or more vinyl monomers and said carbon monoxide under suitable conditions, including a temperatures ranging from about 50 to about 230° C., preferably from about 100° C. to about 200° C., a pressure of from about 100 psig to about 30,000 psig, preferably from about 500 psig to about 5000 psig, and then removing said solvent to obtain a product, comprising a liquid, random, aliphatic polyketone, still more preferably characterized by any one of the aforementioned characteristics, and also the process further comprising a step of partial hydrogenation to obtain a polyketone/polyol characterized by (a) a number-averaged MW of 600-1000 g/mol; (b) volatility <1% at 160 C; (c) color of less than 50 Pt/Co; and (d) unsaturation content of <1%, and also the process wherein said solvent is selected from toluene, benzene, dioxane, butane, pentane, heptane, hexane, propylene oxide, cyclohexane, MEK, acetone and mixtures thereof, particularly wherein any of the aforementioned processes is characterized as comprising, as a hydrocarbon source feedstream, at least one of steam cracked mixed C4 streams and refinery mixed C4 streams, and/or wherein the feed stream comprising carbon monoxide includes synthesis gas. Yet other preferred embodiments include articles comprising polyketone and/or polyketone-polyols characterized by the aforementioned characteristics, especially articles selected from wire and cable insulation and jacketing, a sheet, a film, wall covering, stationary products, shower curtains, table cloth, shoes, and synthetic leather, toys, vinyl backed carpet tiles, flooring tiles, medical articles such as bags, tubes, and the like, underbody auto coatings and/or sealants. Yet still additional preferred embodiments are: a composition comprising at least one liquid, random, aliphatic polyketone prepared from at least one vinyl monomer and carbon monoxide and preferably having at least one of the following characteristics: (a) Tg <−50° C.; (b) volatility <1% at 160° C.; (c) color of less than 50 Pt/Co; (d) olefinic carbon content of <1 mol %; (e) viscosity at 25° C.<1500 cP, preferably also wherein said at least one polyketone compound is prepared from monomer units of ethylene, carbon monoxide, and at least one butene, with any of these embodiments being further characterized by said at least one polyketone compound comprises 53-80 wt % ethylene, 16-25 wt % carbon monoxide, 10-20 wt % butene; and also a composition comprising at least one polyketone-polyol product made by at least partially hydrogenating a liquid, random, polyketone compound, said polyketone prepared by free-radical polymerization of at least one vinyl monomer and carbon monoxide in the presence of a free-radical initiator and at least one solvent, preferably wherein said at least one polyketone-polyol product is characterized by a number-averaged molecular weight of 600-1000 g/mol, having a Tg <−50° C., having a volatility <1% at 160° C., and a color of less than 50 Pt/Co, an olefinic carbon content of <1 mol %, and a viscosity at 25° C.<1500 cP, which in embodiments may be further characterized as containing 1-30 mol % oxygen, relative to all the oxygen present in said at least one polyketone-polyol product, in C—OH groups, as measured by $^1$H or $^{13}$C NMR, and/or characterized as further comprising an epoxide-containing compound selected from epoxidized soybean oil (ESO), epoxy esters, epoxide polymers (EPAL), and mixtures thereof, and/or further characterized, and/or further comprising at least one plasticizer compound selected from phthalic acid esters, adipic acid esters, trimellitic acid esters, cyclohexanoates, cyclohexane dicarboxylic esters, and benzoates, and/or further comprising a polymer system selected from the group consisting of polyvinyl chloride, polyvinyl butyral, acrylic polymers, methacrylic polymers, poly(vinyldiene chloride), nylon, polyolefins, polyurethanes, fluoroplastics, and mixtures thereof, and/or wherein said polyketone/polyol is further characterized as comprising ethylene, butenes, carbon monoxide monomer units, and/or wherein said polyketone-polyol is further characterized as comprising 53-80 wt % ethylene, 16-25 wt % carbon monoxide, 5-20 wt % butene, with a number-averaged MW of 600-1000 g/mol, having a Tg <−50° C., and wherein during said at least partial hydrogenation 1-30% of the carbonyl groups in said polyketone are reduced, and/or wherein during said at least partial hydrogenation 10-30% of the carbonyl groups in said polyketone are reduced. Not the least of which preferred embodiment is also a batch, semi-batch or continuous process, very preferably a process that occurs in a CSTR, comprising free radical copolymerization of one or more vinyl monomers and carbon monoxide, including contacting a first feedstream comprising said one or more vinyl monomers with a second feedstream comprising carbon monoxide in a single reactor in the presence of a free radical initiator and a solvent, and oligomerizing said at least one or more vinyl monomers and said carbon monoxide under suitable conditions, advantageously conditions including a temperatures ranging from about 50 to about 230° C., a pressure of from about 100 psig to about 30,000 psig, and then removing all of said solvent (which should be taken to mean all or substantially all of said solvent, excepting for inevitable loss of solvent in the process, which may include loss by incorporation of portions of the solvent in the polymer backbone, such as may occur when toluene is used as a solvent) said solvent to obtain a product, comprising a liquid, random, aliphatic polyketone, which may also include a step of partial hydrogenation of said polyketone to provide a polyketone-polyol characterized by at least one of (a) Tg <−50° C.; (b) volatility <1% at 160° C.; (c) color of less than 50 Pt/Co; (d) olefinic carbon content of <1 mol %; (e) viscosity at 25° C.<1500 cP, (f) a number-averaged MW of 600-1000 g/mol; (g) volatility <1% at 160 C; and (h) unsaturation content of <1%, and finally but not least wherein the combination of preferred embodiments wherein the single reactor is a CSTR, said solvent is selected from toluene, benzene, dioxane, pentane, heptane, hexane, propylene oxide, cyclohexane, MEK, acetone, butane, and mixtures thereof, and the source of said vinyl monomers includes at least one refinery or chemical plant pipestill, preferably Raffinate-1, Raffinate-2, or a steam cracker.

What is claimed is:

1. A composition comprising at least one polyketone-polyol product made by at least partially hydrogenating a liquid, random, polyketone compound, said polyketone prepared by free-radical polymerization of at least one vinyl monomer and carbon monoxide in the presence of a free-radical initiator and at least one solvent; wherein during said partial hydrogenation 1-30% of the carbonyl groups in said polyketone are reduced.

2. The composition according to claim 1, wherein said at least one polyketone-polyol product is characterized by a number-averaged molecular weight of 600-1000 g/mol, having a Tg<−50° C., having a volatility <1% at 160° C., and a color of less than 50 Pt/Co, an olefinic carbon content of <1 mol %, and a viscosity at 25° C. <1500 cP.

3. The composition according to claim 1, wherein said at least one polyketone-polyol product is characterized as containing 1-30 mol % oxygen, relative to all the oxygen present in said at least one polyketone-polyol product, in C—OH groups, as measured by $^1$H or $^{13}$C NMR.

4. The composition according to claim 1, further comprising an epoxide-containing compound selected from epoxidized soybean oil (ESO), epoxy esters, epoxide polymers (EPAL), and mixtures thereof.

5. The composition according to claim 1, further comprising at least one plasticizer compound selected from phthalic acid esters, adipic acid esters, trimellitic acid esters, cyclohexanoates, cyclohexane dicarboxylic esters, and benzoates.

6. The composition according to claim 1, further comprising a polymer system selected from the group consisting of polyvinyl chloride, polyvinyl butyral, acrylic polymers, methacrylic polymers, poly(vinyldiene chloride), nylon, polyolefins, polyurethanes, fluoroplastics, and mixtures thereof.

7. The composition according to claim 1, wherein said polyketone/polyol is further characterized as comprising ethylene, butenes, carbon monoxide monomer units.

8. The composition according to claim 1, wherein said polyketone-polyol is further characterized as comprising 53-80 wt % ethylene, 16-25 wt % carbon monoxide, 5-20 wt % butene, with a number-averaged MW of 600-1000 g/mol, having a Tg <−50° C., and wherein during said partial hydrogenation 1-30% of the carbonyl groups in said polyketone are reduced.

9. The composition according to claim 1, wherein during said partial hydrogenation 10-30% of the carbonyl groups in said polyketone are reduced.

* * * * *